(12) United States Patent  (10) Patent No.: US 7,203,155 B2
Nakamura et al.  (45) Date of Patent: Apr. 10, 2007

(54) OPTICAL DISC INCLUDING A PLURALITY OF DATA LAYERS

(75) Inventors: Atsushi Nakamura, Osaka (JP); Mamoru Shoji, Osaka (JP); Takashi Ishida, Kyoto (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 11/187,868

(22) Filed: Jul. 25, 2005

(65) Prior Publication Data

US 2005/0259561 A1  Nov. 24, 2005

Related U.S. Application Data

(62) Division of application No. 10/018,363, filed as application No. PCT/JP00/04026 on Jun. 21, 2000, now Pat. No. 6,990,055.

(30) Foreign Application Priority Data

| Jun. 22, 1999 | (JP) | ................................. 11-174986 |
| Sep. 7, 1999 | (JP) | ................................. 11-252394 |
| Dec. 16, 1999 | (JP) | ................................. 11-357227 |

(51) Int. Cl.
*G11B 3/70* (2006.01)

(52) U.S. Cl. ...................... 369/283; 369/94; 369/275.3

(58) Field of Classification Search ..................... None
See application file for complete search history.

(56) References Cited

U.S. PATENT DOCUMENTS

| 5,072,435 A | * | 12/1991 | Bakx ........................ 369/47.53 |
| 5,696,743 A | | 12/1997 | Kawasaki |
| 6,208,736 B1 | * | 3/2001 | Gotoh et al. ................. 380/203 |
| 6,221,454 B1 | * | 4/2001 | Saito et al. ................. 428/64.1 |
| 6,370,093 B1 | | 4/2002 | Tada et al. |
| 6,456,584 B1 | * | 9/2002 | Nagata et al. ........... 369/275.2 |
| 6,771,587 B2 | | 8/2004 | Nishiuchi et al. |

FOREIGN PATENT DOCUMENTS

| CN | 1206183 | 1/1999 |
| EP | 0 724 256 | 7/1996 |
| EP | 0 807 926 | 11/1997 |
| GB | 2 327 525 | 1/1999 |

(Continued)

*Primary Examiner*—Paul W. Huber
(74) *Attorney, Agent, or Firm*—Wenderoth, Lind & Ponack, L.L.P.

(57) ABSTRACT

When recording or reading an optical disc having plural data recording layers, which data recording layer the light spot is focused on is detected to improve playback signal quality and signals written to the layer on which the light spot is focused are read more reliably. A convergent lens converges the laser beam on the optical disc, and a focus controller controls the focal point of the laser beam on the data layer. A tracking controller positions and tracks the focal point of the laser beam converged by the convergent lens on a track of the optical disc. A photodetector detects the reflected laser beam from the disc. A convergence detector then detects the convergence state of the laser beam emitted to the plural data recording layers. Based on output from the convergence detector, the laser driver is controlled to separately set beam power appropriately for each of the plural data layers of the disc during playback.

2 Claims, 36 Drawing Sheets

FOREIGN PATENT DOCUMENTS

| | | |
|---|---|---|
| JP | 63-263644 | 10/1988 |
| JP | 9-128763 | 5/1997 |
| JP | 9-128804 | 5/1997 |
| JP | 9-320084 | 12/1997 |
| JP | 10-11808 | 1/1998 |
| JP | 10-500525 | 1/1998 |
| JP | 11-3550 | 1/1999 |
| JP | 11-25467 | 1/1999 |
| JP | 11-39657 | 2/1999 |
| WO | 96-28818 | 9/1996 |
| WO | 98/05032 | 2/1998 |

* cited by examiner

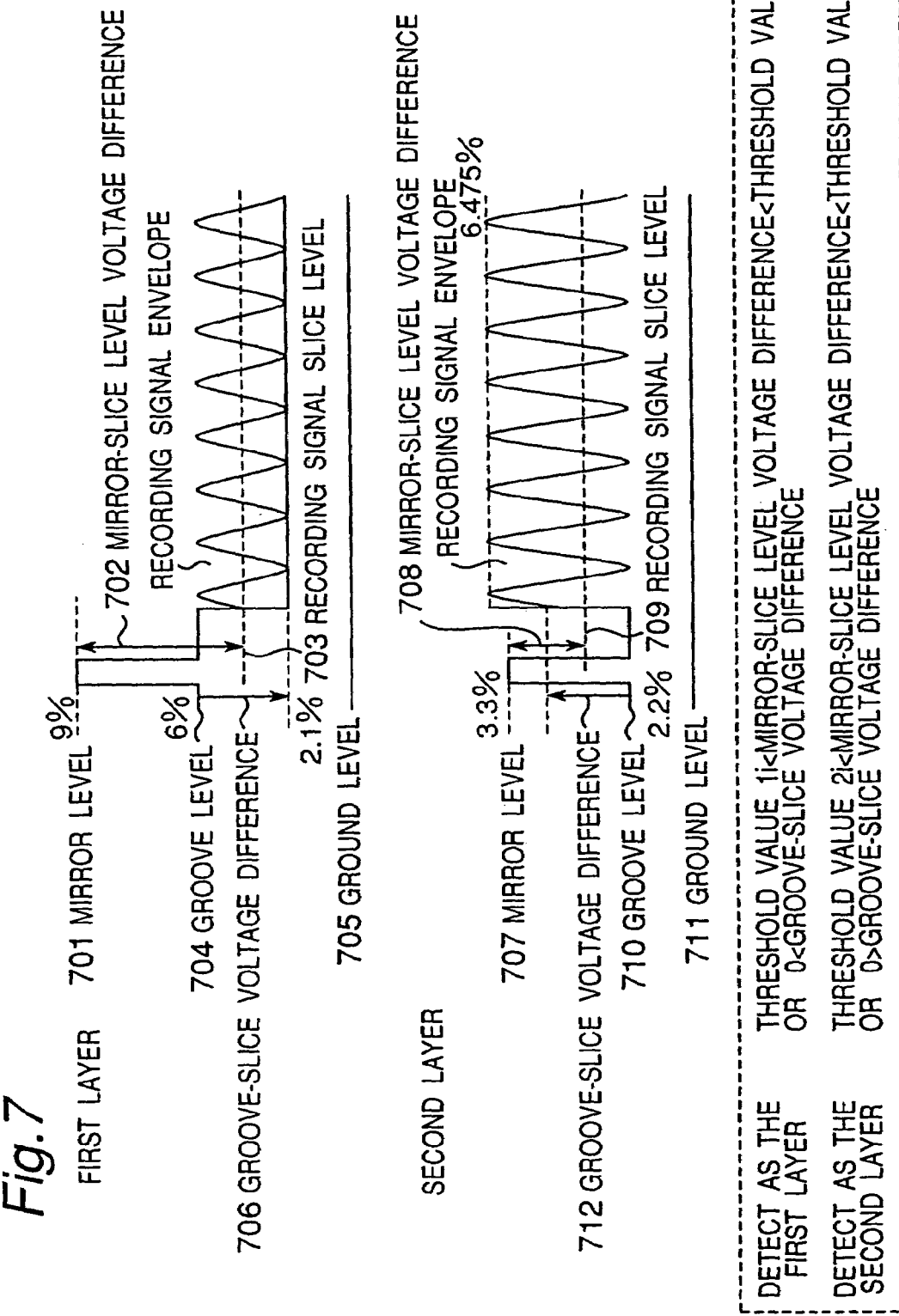

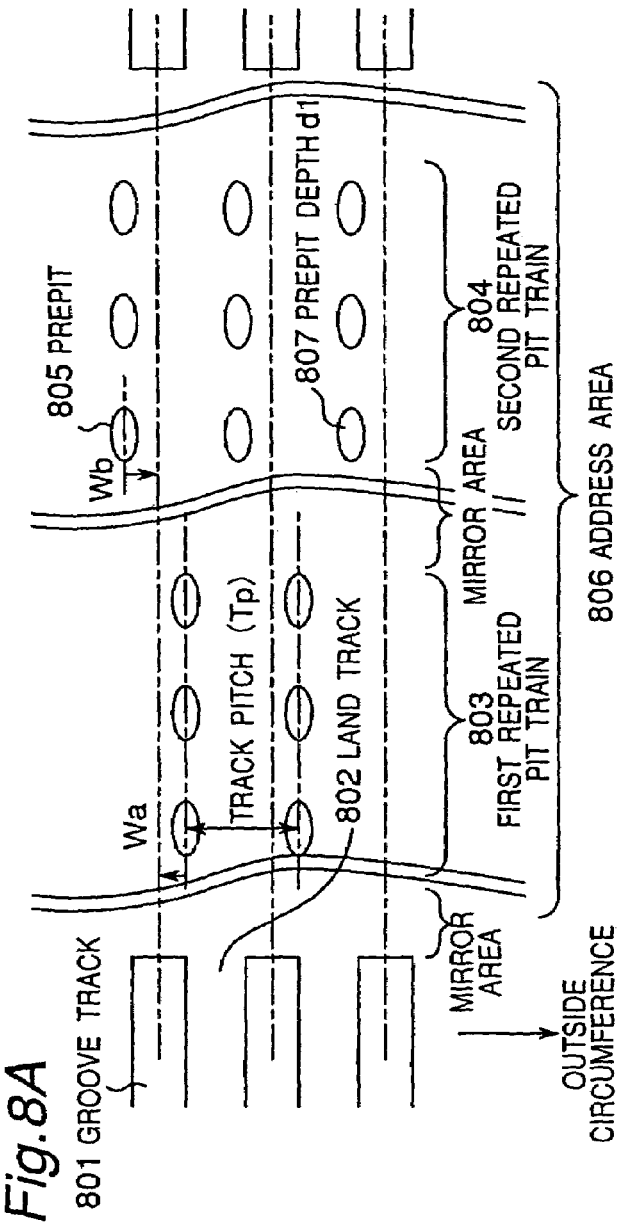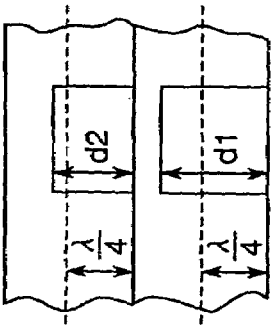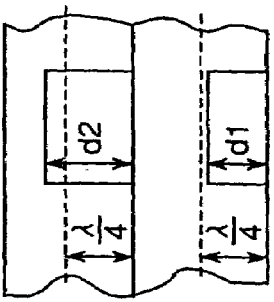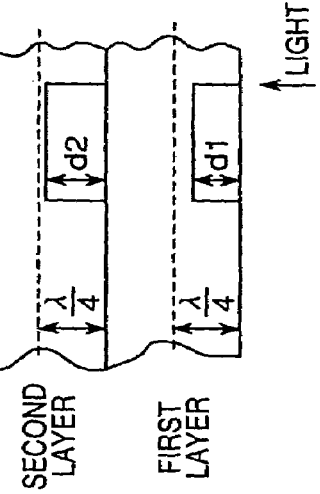

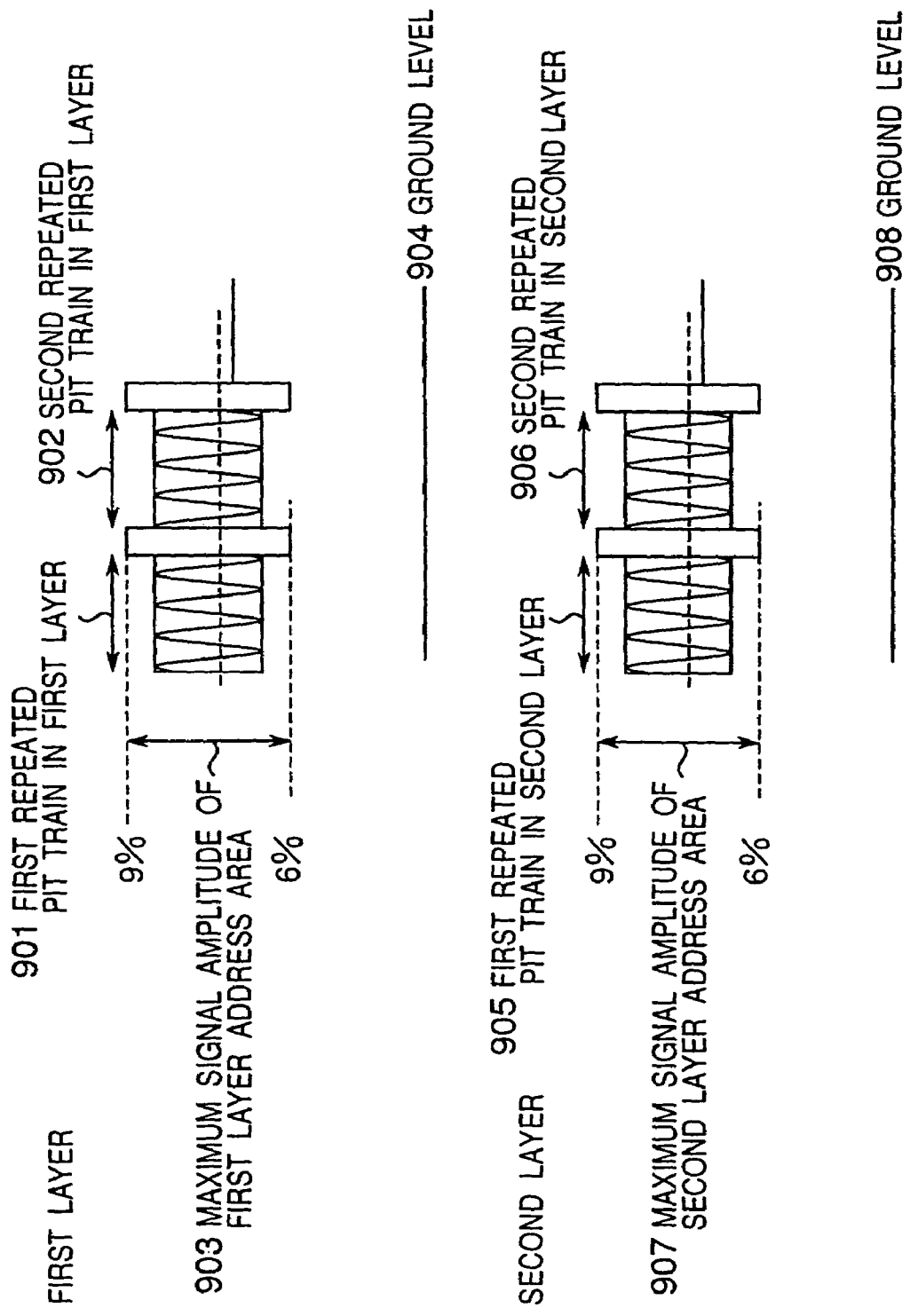

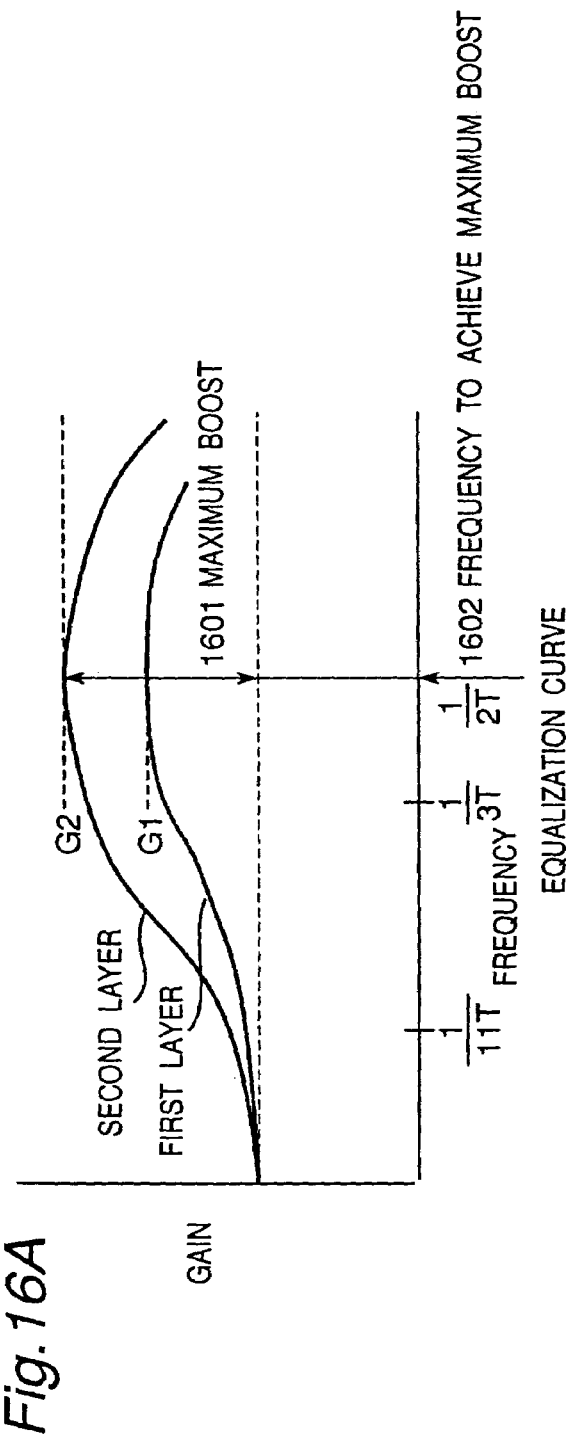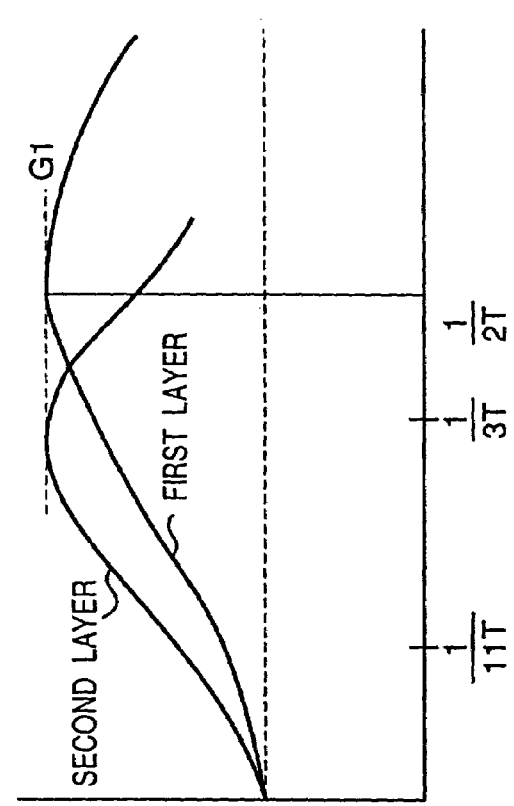
Fig. 16A
Fig. 16B

Fig.28

2801 FIRST PULSE POSITION Tsfp

| LENGTH OF PRECEDING SPACE \ RECORDING MARK LENGTH | 3T | 4T | 5T | >5T |
|---|---|---|---|---|
| 3T | a | b | c | d |
| 4T | e | f | g | h |
| 5T | i | j | k | l |
| >5T | m | n | o | p |

2802 LAST PULSE POSITION Telp

| LENGTH OF FOLLOWING SPACE \ RECORDING MARK LENGTH | 3T | 4T | 5T | >5T |
|---|---|---|---|---|
| 3T | q | r | s | t |
| 4T | u | v | w | x |
| 5T | y | z | aa | ab |
| >5T | ac | ad | ae | af |

Fig.36

3605 RECORDING COMPENSATION TABLE T10

3601 FIRST PULSE POSITION BEFORE RECORDING FIRST LAYER Tsfp

| LENGTH OF PRECEDING SPACE | RECORDING MARK LENGTH | | | |
|---|---|---|---|---|
| | 3T | 4T | 5T | >5T |
| 3T | A1 | B1 | C1 | D1 |
| 4T | E1 | F1 | G1 | H1 |
| 5T | I1 | J1 | K1 | L1 |
| >5T | M1 | N1 | O1 | P1 |

3602 LAST PULSE POSITION BEFORE RECORDING FIRST LAYER Telp

| LENGTH OF FOLLOWING SPACE | RECORDING MARK LENGTH | | | |
|---|---|---|---|---|
| | 3T | 4T | 5T | >5T |
| 3T | Q1 | R1 | S1 | T1 |
| 4T | U1 | V1 | W1 | X1 |
| 5T | Y1 | Z1 | Aa1 | Ab1 |
| >5T | Ac1 | Ad1 | Ae1 | Af1 |

3606 RECORDING COMPENSATION TABLE T11

3603 FIRST PULSE POSITION BEFORE RECORDING FIRST LAYER Tsfp

| LENGTH OF PRECEDING SPACE | RECORDING MARK LENGTH | | | |
|---|---|---|---|---|
| | 3T | 4T | 5T | >5T |
| 3T | A2 | B2 | C2 | D2 |
| 4T | E2 | F2 | G2 | H2 |
| 5T | I2 | J2 | K2 | L2 |
| >5T | M2 | N2 | O2 | P2 |

3604 LAST PULSE POSITION BEFORE RECORDING FIRST LAYER Telp

| LENGTH OF FOLLOWING SPACE | RECORDING MARK LENGTH | | | |
|---|---|---|---|---|
| | 3T | 4T | 5T | >5T |
| 3T | Q2 | R2 | S2 | T2 |
| 4T | U2 | V2 | W2 | X2 |
| 5T | Y2 | Z2 | Aa2 | Ab2 |
| >5T | Ac2 | Ad2 | Ae2 | Af2 |

OPTICAL DISC INCLUDING A PLURALITY OF DATA LAYERS

This application is a divisional application of Ser. No. 10/018,363, filed Apr. 12, 2002 now U.S. Pat. No. 6,990,055, which is a National Stage Application of International Application Serial No. PCT/JP00/04026, filed Jun. 21, 2000.

TECHNICAL FIELD

The present invention relates to an optical disc to which information is recorded by emitting a laser beam to the optical disc surface, and to an optical disc drive for using the optical disc.

BACKGROUND ART

Optical disc drives have been actively developed as a way to record and reproduce large volumes of data Various approaches have been taken to increase the recording density. Phase change optical disc media drives that use the ability to change the recording layer between crystalline and amorphous states are one such approach.

Phase change optical disc drives heat the recording thin film formed on the disc substrate by emitting a laser beam, thereby causing a change in the crystalline structure of the thin film to record and erase information. Amorphous marks and crystalline spaces between the marks are formed on the optical disc by emitting the laser beam at a peak power level to convert crystalline parts of the recording film to an amorphous state, or at a bias power level to convert amorphous parts to a crystalline state. Reflectance is different in the recorded marks and spaces. When a light spot is focused on the optical disc, differences in mark and space reflectance are detected as a signal, which is then decoded to read the information.

Land and groove recording techniques enable recording marks and spaces to both the land tracks of the guide grooves on the disc and the groove tracks therebetween.

Address prepits are formed also at the factory when the guide grooves are formed in the disc. These address prepits identify specific locations (addresses) on the disc, and recessed pits and lands formed at a constant interval along the tracks. Address information is recorded by controlling whether the pits are formed or not and changing the length of the pit sequence.

A conventional optical disc drive is shown in FIG. 2. Shown in FIG. 2 are the optical disc 201, semiconductor laser 202, collimator lens 203 for converting the light beam emitted from the semiconductor laser to a parallel beam, beam splitter 204, convergent lens 205 for focusing the light beam on the optical disc surface, collective lens 206 for collecting the light beam reflected and diffracted by the optical disc onto a photodetector 207, the photodetector 207 for detecting the light collected thereon by the collective lens, playback signal operator 208 for arithmetically calculating the output voltage of the photodetector, focus controller 209 for controlling the focal point of the light spot on the optical disc surface, tracking controller 210 for controlling the position of the light spot to the tracks on the optical disc, actuator 211 for moving the convergent lens, laser drive unit 212 for driving the semiconductor laser, and signal processing unit 215.

A problem with this conventional configuration is that when data is recorded to or read from an optical disc having plural data layers accessible from one side of the disc and addresses are read from prepits formed in a second data layer (a layer deeper from the disc surface than the first data layer), absorption and reflection by the first (surface) layer causes a loss of power in the beam reaching the second layer. This loss is proportional to the transmittance of light through the first layer.

Light reaching the second layer is then reflected and diffracted by the address prepits in the second layer, passes back through the first layer, and reaches the photodetector. The amount of light in the beam reaching the photodetector is proportional to the square of the first layer transmittance and the reflectance of the second layer.

If, for example, the transmittance of the first layer is 50% and the amount of light in the beam emitted from the laser and incident on the first layer is 1, the amount of light that passes the first layer, reaches the second layer and is diffracted by the second layer, then passes through the first layer again and reaches the photodetector will be 1*(0.5*0.5)–R2=0.25–R2 where R2 is the reflectance of the second layer. In an optical disc in which the optical characteristics are controlled so that the reflectance difference (ΔR) between spaces and recording marks in the first and second layers is the same, the amount of light diffracted by the prepits and returning to the photodetector is dependent upon the transmittance of the first layer and the reflectance of the second layer. If the transmittance of the first layer is low or the reflectance of the second layer is low, a difference occurs in the signal amplitude from the address prepits in the first and second layers. This can make it difficult to accurately read the address information from the prepits in the second layer.

SUMMARY OF INVENTION

The present invention is directed to a solution for the aforementioned problems. An object of this invention is to detect the recording layer on which the light spot is focused by means of a convergence state detection means, improve read signal quality by means of a signal quality boosting means so as to achieve optimal signal quality for the recording layer on which the light spot is focused, and thereby improve the playback signal quality for address signals reproduced from prepits in the second recording layer.

To resolve the problems of the prior art and achieve the above objects, an optical disc according to the present invention is an optical disc having preformed identification signals indicating disc positions and a plurality of data layers for recording data signals using a local change in an optical constant or physical shape effected by light beam emission to recording tracks where both spiral or concentric groove tracks and land tracks between the groove tracks formed on each data layer are recording tracks where the identification signals consist of peak and valley prepits of different optical depth or height on the plural data layers.

An optical disc drive according to the present invention has an optical disc having plural data layers; a laser drive means for driving a semiconductor laser; a converging means for converging a light beam on the optical disc, the light beam being light output from the semiconductor laser driven by the laser drive means; a focus control means for controlling a focal position of the convergence point of the light beam converged by the convergence means on the optical disc; a tracking control means for positioning the convergence point of the light beam converged by the convergence means on a track of the optical disc; a photodetection means for detecting reflection of the converged light beam from the optical disc; and a convergence detection means for detecting convergence of the light beam emitted to the plural data layers of the optical disc; wherein the optical disc drive controls the laser drive means based on output from the convergence detection means, and sets light beam emission power when reading the disc separately for the plural data layers of the optical disc.

An optical disc drive according to a further aspect of the present invention has an optical disc having plural data layers; a laser drive means for driving a semiconductor laser; a converging means for converging a light beam on the optical disc, the light beam being light output from the semiconductor laser driven by the laser drive means; a focus control means for controlling a focal position of the convergence point of the light beam converged by the convergence means on the optical disc; a tracking control means for positioning the convergence point of the light beam converged by the convergence means on a track of the optical disc; a photodetection means for detecting reflection of the converged light beam from the optical disc; a gain control means for controlling changing the gain of output from the photodetection means; and a convergence detection means for detecting convergence of the light beam emitted to the plural data layers of the optical disc; wherein the optical disc drive controls the gain control means based on output from the convergence detection means, and sets the output voltage of the photodetection means when reading the disc separately for the plural data layers of the optical disc.

An optical disc drive according to a further aspect of the present invention has an optical disc having plural data layers; a laser drive means for driving a semiconductor laser; a converging means for converging a light beam on the optical disc, the light beam being light output from the semiconductor laser driven by the laser drive means; a focus control means for controlling a focal position of the convergence point of the light beam converged by the convergence means on the optical disc; a tracking control means for positioning the convergence point of the light beam converged by the convergence means on a track of the optical disc; a photodetection means for detecting reflection of the converged light beam from the optical disc; an equalization control means for controlling the equalization characteristics of photodetection means output; and a convergence detection means for detecting convergence of the light beam emitted to the plural data layers of the optical disc; wherein the optical disc drive sets the equalization characteristics for each of the plural data layers based on output from the convergence detection means.

An optical disc drive according to a further aspect of the present invention has an optical disc having plural data layers; a laser drive means for driving a semiconductor laser; a converging means for converging a light beam on the optical disc, the light beam being light output from the semiconductor laser driven by the laser drive means; a focus control means for controlling a focal position of the convergence point of the light beam converged by the convergence means on the optical disc; a tracking control means for positioning the convergence point of the light beam converged by the convergence means on a track of the optical disc; a photodetection means for detecting reflection of the converged light beam from the optical disc; and a convergence detection means for detecting convergence of the light beam emitted to the plural data layers of the optical disc; wherein the optical disc drive sets the focal position for each of the plural data layers based on output from the convergence detection means.

An optical disc drive according to a further aspect of the present invention has an optical disc having plural data layers; a laser drive means for driving a semiconductor laser; a converging means for converging a light beam on the optical disc, the light beam being light output from the semiconductor laser driven by the laser drive means; a focus control means for controlling a focal position of the convergence point of the light beam converged by the convergence means on the optical disc; a tracking control means for positioning the convergence point of the light beam converged by the convergence means on a track of the optical disc; a photodetection means for detecting reflection of the converged light beam from the optical disc; and a convergence detection means for detecting convergence of the light beam emitted to the plural data layers of the optical disc; wherein the optical disc drive sets the tracking position for each of the plural data layers based on output from the convergence detection means.

An optical disc drive according to a further aspect of the present invention has an optical disc having plural data layers; a laser drive means for driving a semiconductor laser; a converging means for converging a light beam on the optical disc, the light beam being light output from the semiconductor laser driven by the laser drive means; a focus control means for controlling a focal position of the convergence point of the light beam converged by the convergence means on the optical disc; a tracking control means for positioning the convergence point of the light beam converged by the convergence means on a track of the optical disc; a tilt control means for controlling tilt of the convergence point of the light beam converged by the converging means at the optical disc surface; a photodetection means for detecting reflection of the converged light beam from the optical disc; and a convergence detection means for detecting convergence of the light beam emitted to the plural data layers of the optical disc; wherein the tilt position is set for each of the plural data layers based on output from the convergence detection means.

Other objects and attainments together with a fuller understanding of the invention will become apparent and appreciated by referring to the following description and claims taken in conjunction with the accompanying drawings.

BRIEF DESCRIPTION OF DRAWINGS

FIG. 7 describes convergence state detection means of an optical disc drive according to a fourth embodiment of the present invention;

FIGS. 8A to 8D describe the configuration of an optical disc according to a first embodiment of the present invention;

FIG. 9 describes a waveform after signal quality improvement by an optical disc drive according to a fourth embodiment of the present invention;

FIG. 16A and 16B are graphs used to describe equalizer characteristics in a seventh embodiment of the invention;

FIG. 28 is used to describe the recording compensation principle of a twelfth embodiment of the present invention;

FIG. 36 is used to describe the recording compensation principle of the fourteenth embodiment of the present invention.

BEST MODE FOR CARRYING OUT THE INVENTION

The preferred embodiments of the present invention are described below with reference to the accompanying figures.

Embodiment 1

Figure 1:
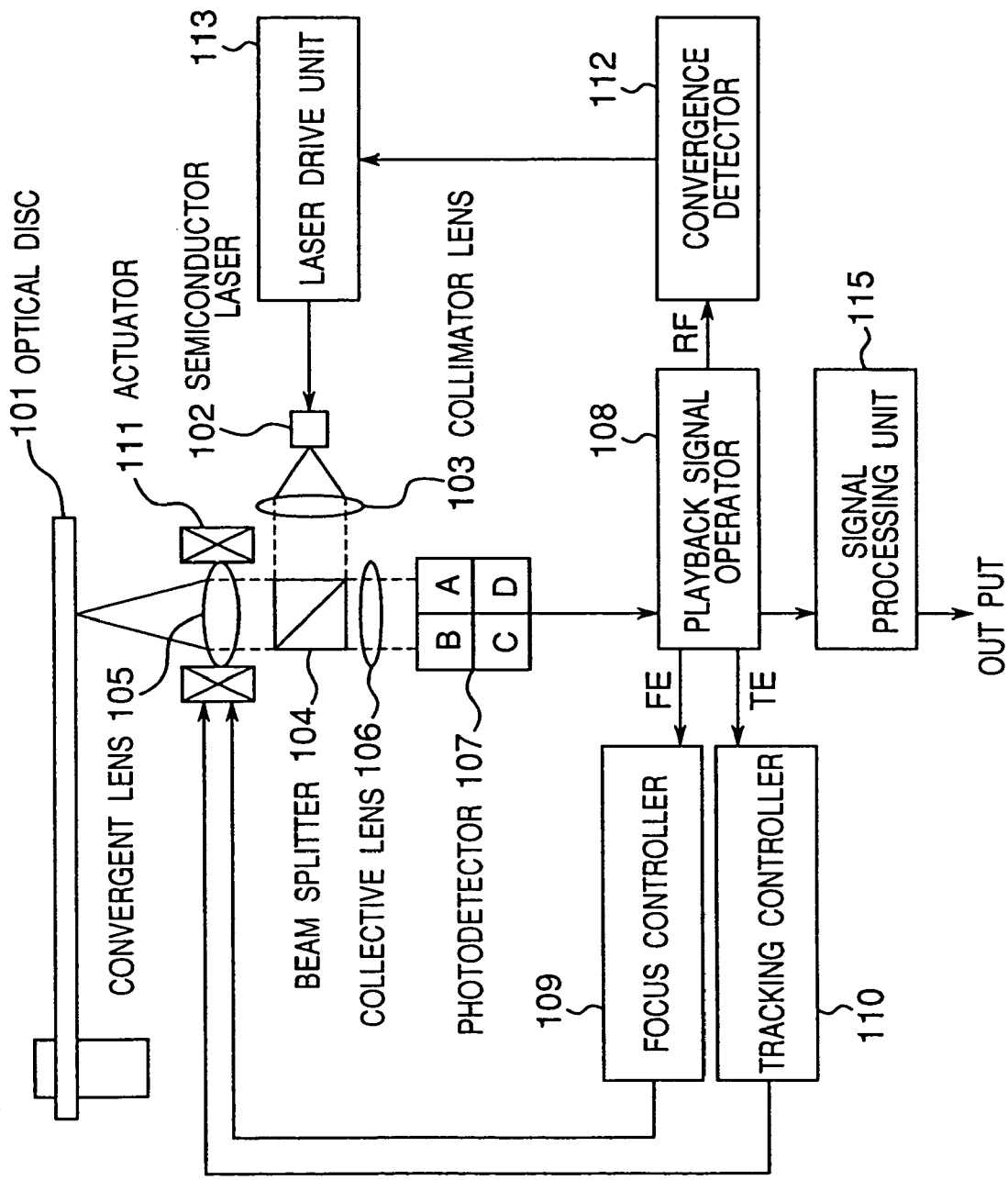
FIG. 1 is a block diagram of an optical disc drive according to the first and fifth embodiments of the present invention.
Figure 2:
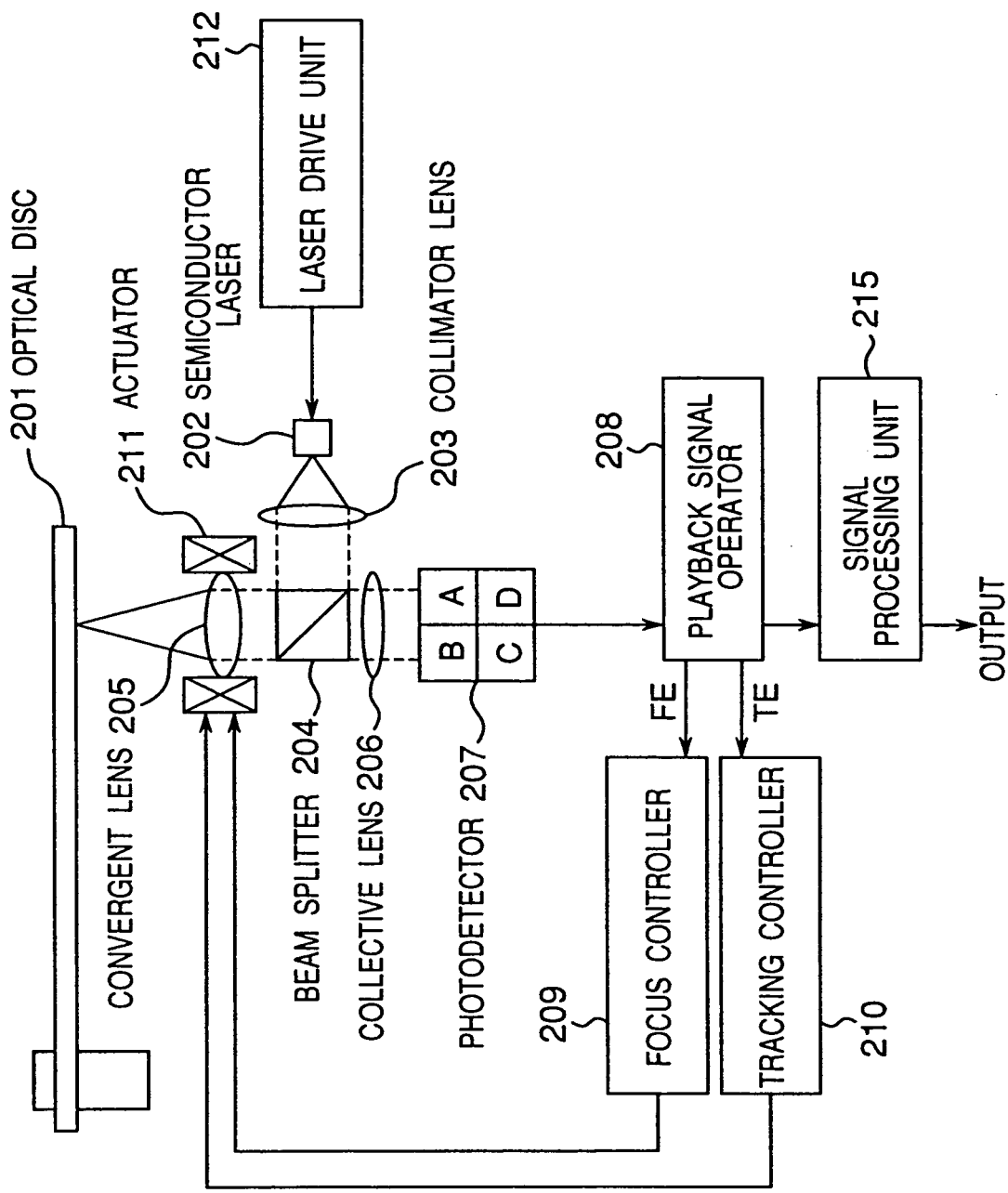
FIG. 2 is a block diagram of an optical disc drive according to the prior art.

FIG. 1 is a block diagram of an optical disc drive according to a first embodiment of the present invention. Shown in FIG. 1 are an optical disc 101, semiconductor laser 102, collimator lens 103, beam splitter 104, convergent lens 105, collective lens 106, photodetector 107, playback signal operating means 108, focus controller 109, tracking controller 110, actuator 111, convergence detector 112, laser drive unit 113, and signal processing unit 115.

The playback operation of this optical disc drive is described next.

The optical disc 101 in this example has two data recording layers. A light spot from the laser is converged on one of these two layers to read data from that layer.

The light beam emitted from the semiconductor laser 102 passes the collimator lens 103, beam splitter 104, and convergent lens 105, and is collected on one of the two data recording layers. The collected light spot is reflected and diffracted by the optical disc 101, passes back through the convergent lens 105, beam splitter 104, and collective lens 106, and is collected on the photodetector 107. Photodetection elements A, B, C, D of the photodetector 107 each output a voltage signal corresponding to the amount of light collected thereon, and the playback signal operating means 108 performs an arithmetic operation on these voltage signals.

The playback signal operating means 108 passes output signal FE to the focus controller 109, output signal TE to the tracking controller 110, and output signal RF to the convergence detector 112.

The focus controller 109 applies voltage determined by output signal FE to the actuator 111 to control the focal position of the light spot on one of the two data recording layers of the optical disc 101.

The tracking controller 110 similarly applies voltage determined by output signal TE to the actuator 111 to control the tracking position of the light spot so that the spot tracks a desired track on the desired data recording layer of the optical disc 101.

Information recorded to the optical disc is read by reading the prepit peaks and valleys on the optical disc or by reading the marks and spaces with different reflectance on a phase change optical disc.

The convergence detector 112 detects from the RF signal on which of the two data recording layers on the optical disc 101 the light spot is converged. The result is passed to the laser drive unit 113, which controls light output from the semiconductor laser 102.

The structure of the optical disc 101 is described next.

Figure 3:
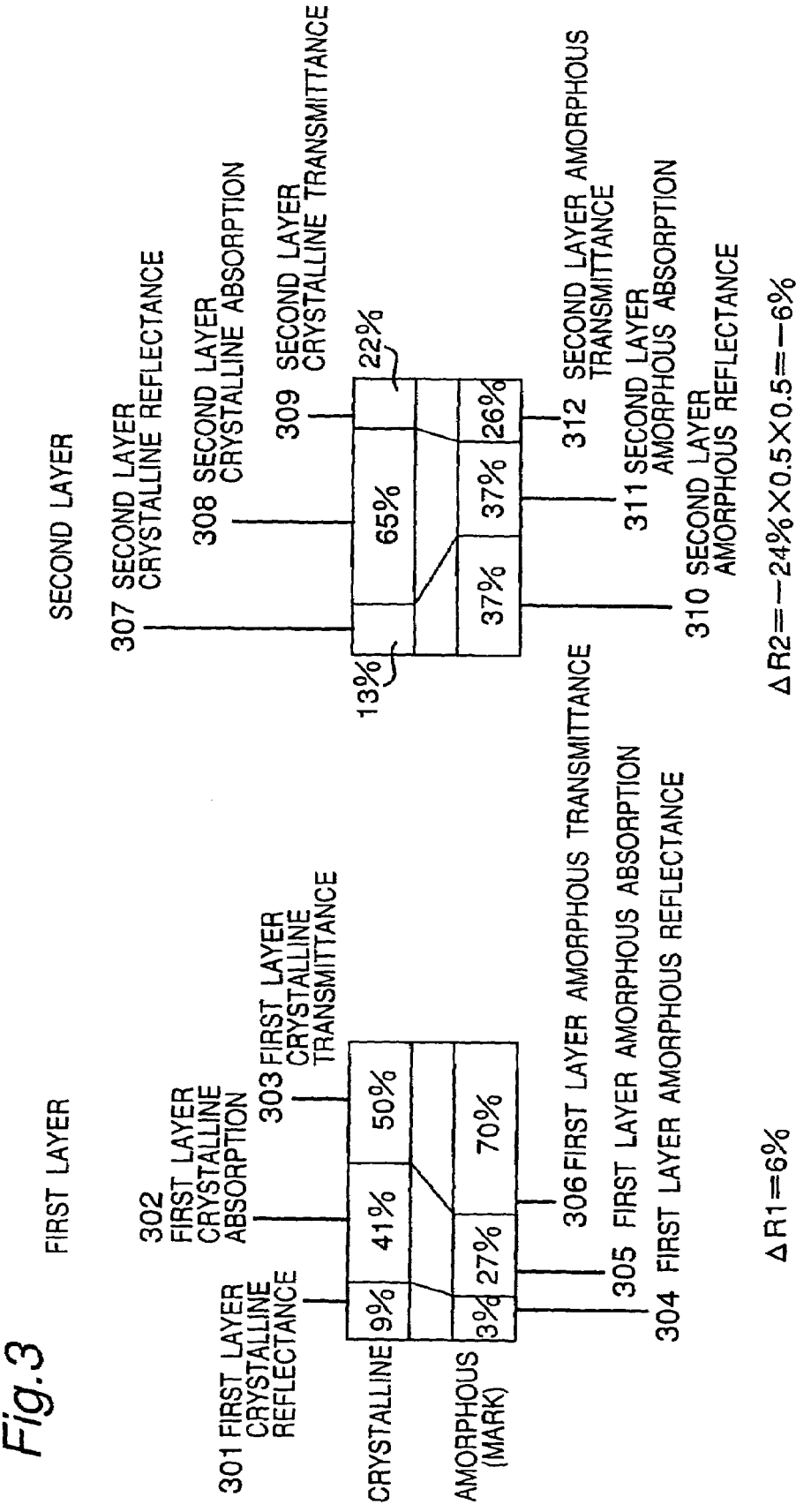
FIG. 3 shows the configuration of an optical disc recorded and reproduced by an optical disc drive according to a first embodiment of the present invention.

An example of the optical characteristics of an optical disc with two data recording layers is described first with reference to FIG. 3.

The data recording layer on the side to which the laser beam is incident is the first data layer. Only light beams that have passed through the first data layer reach the second data layer. An optical disc drive for phase change media drives a semiconductor laser at a peak power level to convert crystalline spaces in the data layer to amorphous marks, or at a bias power level to convert the amorphous marks to crystalline spaces. By emitting the laser to the optical disc at the appropriate power level, the optical disc drive creates the marks (amorphous) and spaces (crystalline) used to encode data.

The structures of the first and second data layers are described next.

In the first data layer, the reflectance 301 of a crystalline space is 9%, crystalline absorption 302 is 41%, and crystalline transmittance 303 is 50%. Note that these percentages are based on the intensity of the emitted light beam being 100%.

The reflectance 304 of the amorphous marks in the first data layer is 3%, amorphous absorption 305 is 27%, and amorphous transmittance 306 is 70%.

A signal detected from the data area of the first layer corresponds to a signal for which the difference ($\Delta R1$) between the first layer crystalline reflectance 301 and first layer amorphous reflectance 304 is detected. This first layer $\Delta R1$ is 6%.

In the second data layer, the reflectance 307 of a crystalline space is 13%, crystalline absorption 308 is 65%, and crystalline transmittance 309 is 22%.

The reflectance 310 of the amorphous marks in the second data layer is 37%, amorphous absorption 311 is 37%, and amorphous transmittance 312 is 26%.

A signal detected from the data area of the second layer corresponds to a signal for which the difference ($\Delta R2$) between the second layer crystalline reflectance 307 and second layer amorphous reflectance 310 is detected.

However, only light that has passed the first data layer reaches the second data layer. Likewise, only the light that is reflected and diffracted by the second data layer and then passes back through the first data layer reaches the photodetector.

First layer transmittance differs in the crystalline spaces and amorphous marks, and as noted above is 50% in the crystalline parts and 70% in the amorphous parts. When the disc is initialized, the entire first layer is crystalline. When the entire first layer is crystalline and first layer crystalline transmittance 303 is 50%, 50% of the emitted light reaches the second layer. Of the light that is reflected and diffracted by the second layer, only 50% passes back through the first layer. There is, therefore, a light loss of 25% (=50%*50%) as a result of the light passing the first layer to the second layer passing back again through the first layer. The second layer signal amplitude ($\Delta R2$) is therefore the product of the 25% loss resulting from two passes through the first layer and the difference between the second layer crystalline reflectance and second layer amorphous reflectance. As a result, $\Delta R2 = -24\% \ast 25\% = -6\%$. Note that the difference between the crystalline reflectance and amorphous reflectance when calculating $\Delta R1$ and $\Delta R2$ is obtained by simple subtraction, that is, (crystalline reflectance)−(amorphous reflectance). Note, further, that $\Delta R2$ for the second layer is a negative value because the second layer crystalline reflectance is less than second layer amorphous reflectance.

Signal amplitude in the first layer data area and second layer data area can be balanced by providing the above described optical characteristics in an optical disc with two data layers, and stable, uniform signal quality can be assured in both the first and second layers.

Figure 4:
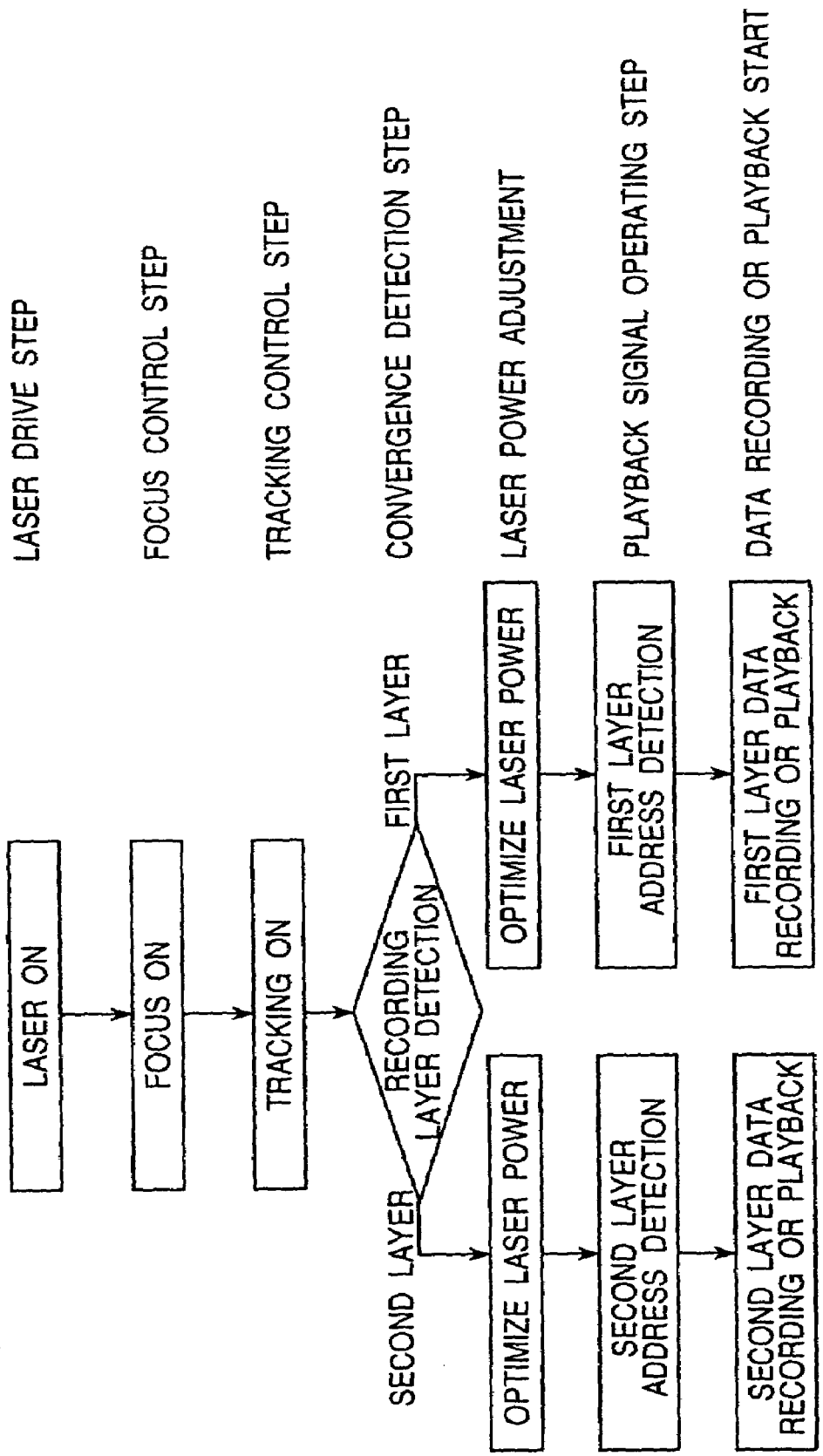
FIG. 4 is a flow chart used to describe the recording and playback principle of an optical disc drive according to a first embodiment of the present invention.

The data recording and playback processes are described next below with reference to FIG. 4.

When an optical disc is inserted to the optical disc drive, the laser drive unit 113 emits a laser beam in the laser drive step (laser on). The focus controller 109 then adjusts the focal position of the light spot to a desired track in a desired data layer at a particular radial position of the disc (focus on). The tracking controller 110 then controls the tracking position of the light spot to a particular track in the first layer in the tracking control step (tracking on). The convergence detector 112 then detects which layer the light spot is converged on in the convergence detection step (recording layer detection).

What happens when the light spot is detected by the convergence detection step to converge on the first layer is described next.

The laser drive step (laser power adjustment) is instructed to adjust laser power so that the playback signal is optimized for the first layer. The laser drive step thus optimizes semiconductor laser power, and the address information is accurately detected (first layer address detection) based on the data output by the playback signal operating step (playback signal operating means 108). Data recording or playback then starts from a specified sector in the first layer.

What happens when the light spot is detected by the convergence detection step to converge on the second layer is described next.

The laser drive step (laser power adjustment) is instructed to adjust laser power so that the playback signal is optimized for the second layer. The laser drive step thus optimizes semiconductor laser power, and the address information is accurately detected (second layer address detection) based on the data output by the playback signal operating step (playback signal operating means 108). Data recording or playback then starts from a specified sector in the second layer.

The playback principle when reading an address area from an optical disc with optical characteristics as shown in FIG. 3 is described next.

FIG. 8A is a schematic diagram showing an address area and the first layer guide groove 801 of the optical disc. The guide groove 801 is a groove track. Groove tracks 801 are separated by land tracks 802. The optical disc is manufactured with the guide groove tracks 801 and prepits 805 formed at constant intervals on the disc as address information indicating a specific location (address) on the disc. The areas where the prepits are formed in the guide grooves of the optical disc are called address areas 806, and the other areas formed in the guide grooves where data is writable are called data areas. Address information is expressed by the presence (or lack) of the prepits and varying the length of the prepits in the address areas 806. The address areas also contain an area where spaces and pits of the same length are preformed. Reference numeral 803 indicates the repeated pit train in the first part of the address area (referred to below as the fist pit train), and reference numeral 804 indicates the repeated pit train in the second part of the address area (referred to below as the second pit train). These repeated pit trains in the first and second parts of the address area are staggered on the inside circumference and outside circumference sides of the guide groove track 801. The distance between the groove track center and the center of the first pit train is Wa, and the distance between the groove track center and the center of the second pit train is Wb. The distance between adjacent pit trains is track pitch Tp. The relationship between Wa, Wb, and Tp is Wa=Wb=Tp/2. Reference numeral 807 indicates the prepit depth; the depth of prepits in the first layer is d1, and the depth of prepits in the second layer is d2.

While the structure of the first layer is shown in FIG. 8A and described above, it will be noted that the structure of the second layer is identical to the first layer except that the prepit depth in the second layer is d2.

Figure 5:
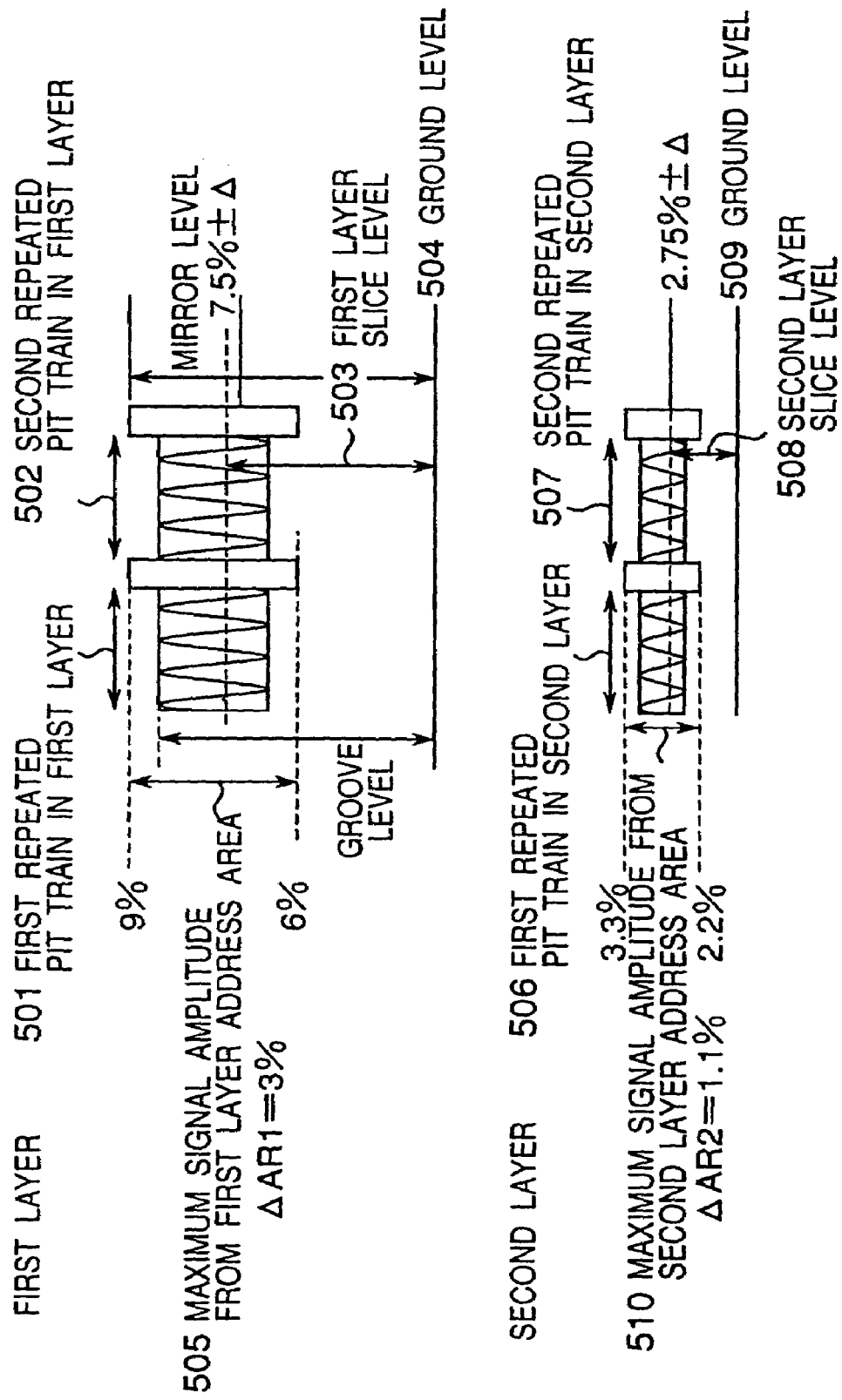
FIG. 5 describes convergence state detection means of an optical disc drive according to a first embodiment of the present invention.

The waveform of the playback signal when the light spot passes the address area as shown in FIG. 8A is shown in FIG. 5.

When the light spot scans the address area of the first layer is described next.

The top part of FIG. 5 shows the playback signal waveform 501 from the fist pit train in the first layer, and the playback signal waveform 502 from the second pit train in the first layer. Reference numeral 503 indicates the voltage from the ground level 504 of the average of the medians of the playback signal waveforms from the first pit train and the second pit train. Reference numeral 505 is the maximum signal amplitude ΔAR1 from the first layer address area, and in an optical disc with optical characteristics as shown in FIG. 3 ΔAR1 is 3%.

When the light spot scans the address area of the second layer is described next.

The bottom part of FIG. 5 shows the playback signal waveform 506 from the first pit train in the second layer, and the playback signal waveform 507 from the second pit train in the second layer. Reference numeral 508 indicates the voltage from the ground level 509 of the average of the medians of the playback signal waveforms from the first pit train and the second pit train. Reference numeral 510 is the maximum signal amplitude ΔAR2 from the second layer address area, and in an optical disc with optical characteristics as shown in FIG. 3 ΔAR2 is 1.1%.

The diffraction ratio of the prepits to the mirror surface area, which is the amount of light diffracted by the pits and returning to the photodetector, is 66%. Prepit depth is the same in the first and second layers. The prepit diffraction ratio to the mirror area depends upon the prepit depth, width, and length, and while is described as 66% in this example, the diffraction ratio can obviously differ. The difference between the maximum signal amplitude 505 from the first layer address area and the maximum signal amplitude 510 from the second layer address area is approximately three times, and the prepit addresses cannot be correctly reproduced in each of the layers due to differences in the signal quality from the first layer and second layer.

It is therefore necessary to determine whether the light spot is converged on the first layer or second layer using the convergence detector 112 shown in FIG. 1 to improve playback signal quality in the address area accordingly.

The prepit amplitude is changed in the first layer and second layer in order to adjust the signal amplitude in the address areas of the first and second layers.

Figure 10:
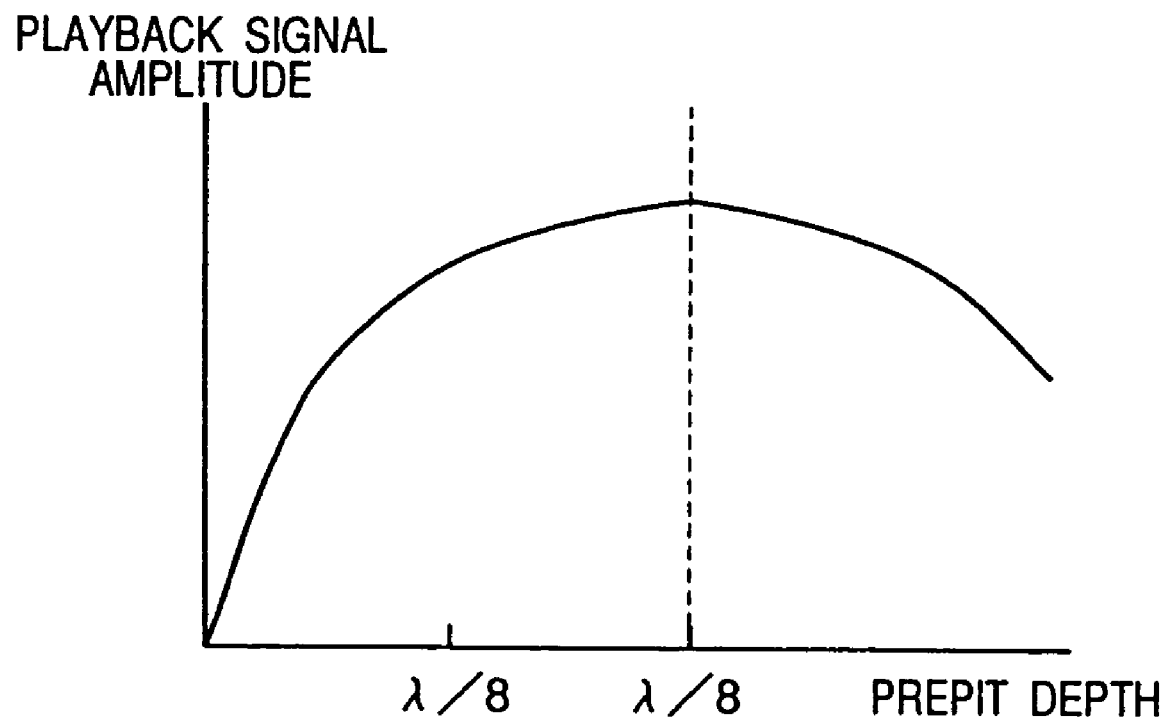
FIG. 10 is a graph used to describe an optical disc according to a first embodiment of the present invention.

The relationship between prepit depth and the playback signal amplitude of the prepit address areas is shown in FIG. 10. As shown in FIG. 10, prepit address playback signal amplitude is greatest when the light wavelength is λ if the effective prepit groove depth is λ/4.

The difference between the signal amplitude from address prepits in the first and second layers can be reduced in an optical disc according to the present invention by adjusting prepit depth in the first layer and prepit depth in the second layer.

This is described more specifically below.

Second layer address amplitude can be increased by forming the prepits as shown in FIG. 8B so that:

$$d1 < d2 <= \lambda/4.$$

By making the depth of second layer prepits less than or equal to λ/4 and approximately λ/4, and making the prepit depth in the first layer less than the prepit depth in the second layer to reduce the first layer address amplitude, a disc configured as described by the above equation has the effect of increasing playback signal amplitude from the second layer address prepits, and improving signal amplitude in the second layer address area by reducing playback signal amplitude from the first layer address prepits and reducing the amplitude difference in signals from the first layer and second layer address prepits.

Another possible configuration is shown in FIG. 8C, which can be expressed as:

$$d1 < \lambda/4 <= d2, \text{ and } d1 > (d2 - \lambda/4).$$

In this configuration the groove depth of second layer prepits is greater than or equal to λ/4 and approximately equal to λ/4, and the depth of first layer prepits is less than (second layer prepit depth) minus (λ/4) to reduce first layer address amplitude, thereby increasing playback signal amplitude from second layer address prepits. In addition, signal amplitude from second layer address areas is improved by reducing playback signal amplitude from the first layer address prepits and reducing the amplitude difference between playback signals from first and second layer address prepits.

A yet further possible configuration is shown in FIG. 8D and can be expressed as:

$$\lambda/4 <= d2 < d1.$$

In this configuration the depth of second layer prepits is greater than or equal to λ/4 and approximately equal to λ/4, and the first layer prepit depth is greater than the second layer prepit depth to reduce the first layer address signal amplitude, thereby effectively increasing the playback signal amplitude from second layer address prepits. In addition, the second layer address area playback signal amplitude is improved by reducing the playback signal amplitude from the first layer address prepits and reducing the amplitude difference between playback signals from first and second layer address prepits.

The depth of prepits in an optical disc according to the present invention refers to the optical depth or height with consideration for the refractivity of the medium.

Embodiment 2

A method for discriminating the first layer and second layer of an optical disc using a physical feature of the disc is described in the above first embodiment using an optical disc in which the groove depth is different in the first and second layers. This second embodiment of the invention describes a method whereby the disc recorder or player discriminates the first and second layers using an optical disc in which the groove depth is the same in the first and second layers.

The following second to fourth embodiments describe a convergence detector 112 for determining whether the light spot is focused on the first layer or on the second layer when a signal is generated by focusing a light spot on the optical disc.

The second embodiment of the invention is described first with reference to the figures.

A convergence detector 112 for detecting light spot convergence using a playback signal from the prepits in the address area is described with reference to FIG. 5 and FIG. 21. The configuration of the optical disc drive is identical to that of the first embodiment shown in FIG. 1.

In order to determine whether the light spot is focused on the first layer or second layer, the convergence detector 112 of the optical disc drive of the present invention determines the slice level voltage 2103 of the address signal, which is the average of the median of the playback signal waveform of the first pit train 2101 and the median of the playback signal waveform of the second pit train 2102, and then determines whether the slice level is in a first voltage range (between threshold value 1*a* and threshold value 1*b*) or a second voltage range (between threshold values 2*a* and 2*b*). If the slice level voltage is between threshold values 1*a* and 1*b*, the address signal was read from the first layer; if between threshold values 2*a* and 2*b*, the address signal was read from the second layer.

The ranges of threshold values 1*a* to 1*b* and threshold values 2*a* to 2*b* do not overlap. If, for example, as shown in FIG. 5, the slice level is in the range (1*a*–1*b*)=7.5%±Δ, the address signal is from the first layer; if the slice level is in the range (2*a*–2*b*)=2.75%±Δ, the address signal is from the second layer. The convergence detector 112 determines from which layer the signal is read. Note that Δ is 10% of the value on the left. The threshold value range 1*a* to 1*b* is therefore (7.5%+0.75%) to (7.5%−0.75%). The same denotation is used below.

If there are three or more data recording layers, it is only necessary to define additional constant slice level voltage ranges.

Alternatively, the convergence detector 112 in the optical disc drive of this invention can determine whether the light spot is focused on the first layer or second layer based on the maximum address amplitude voltage 2105 detected from the address area. If the maximum address amplitude is within a specified range (threshold values 1*c* to 1*d*), the address is read from the first layer; if within another specific range (threshold values 2*c* to 2*d*), the second layer is recognized.

The threshold value ranges 1*c* to 1*d* and 2*c* and 2*d* also do not overlap. For example, referring again to FIG. 5, maximum address area amplitude Δ*AR*1=(1*c*–1*d*)= 3%±Δ and identifies the first layer, and maximum address area amplitude Δ*AR*2=(2*c*–2*d*)= 1.1%±Δ and identifies the second layer. The convergence detector 112 also makes this determination.

If the number of plural data recording layers is 3 or more, it is again also only necessary to define additional constant maximum address signal amplitude ranges.

This second embodiment of the invention can thus determine from the address area signal on which of plural data recording layers on the optical disc the light spot is focused.

Figure 21:
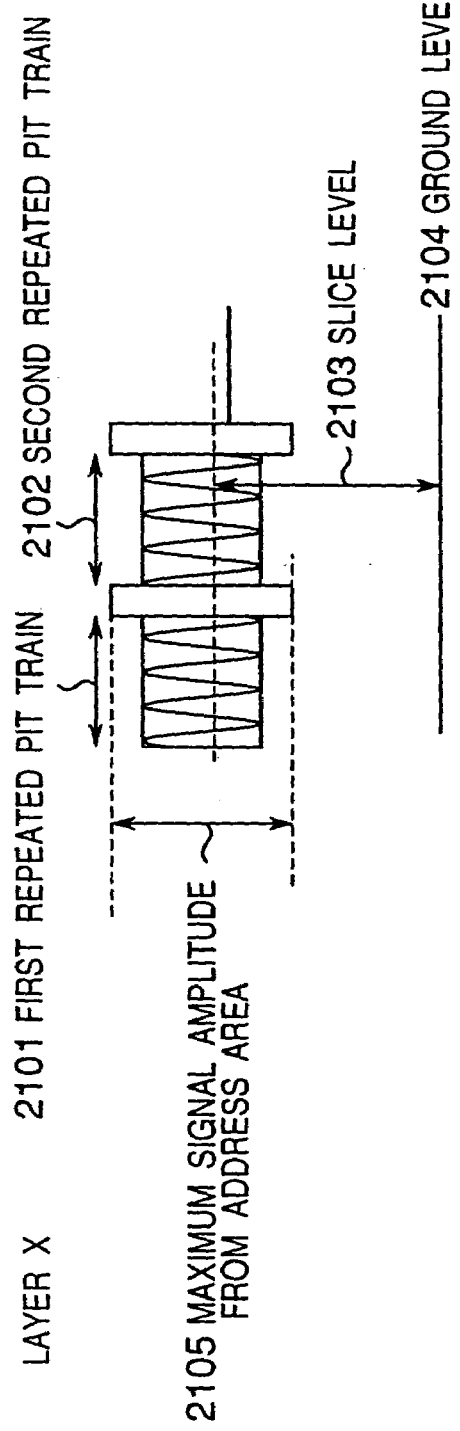
FIG. 21 is used to describe convergence state detection means in an optical disc drive according to a second embodiment of the present invention.
Figure 22:
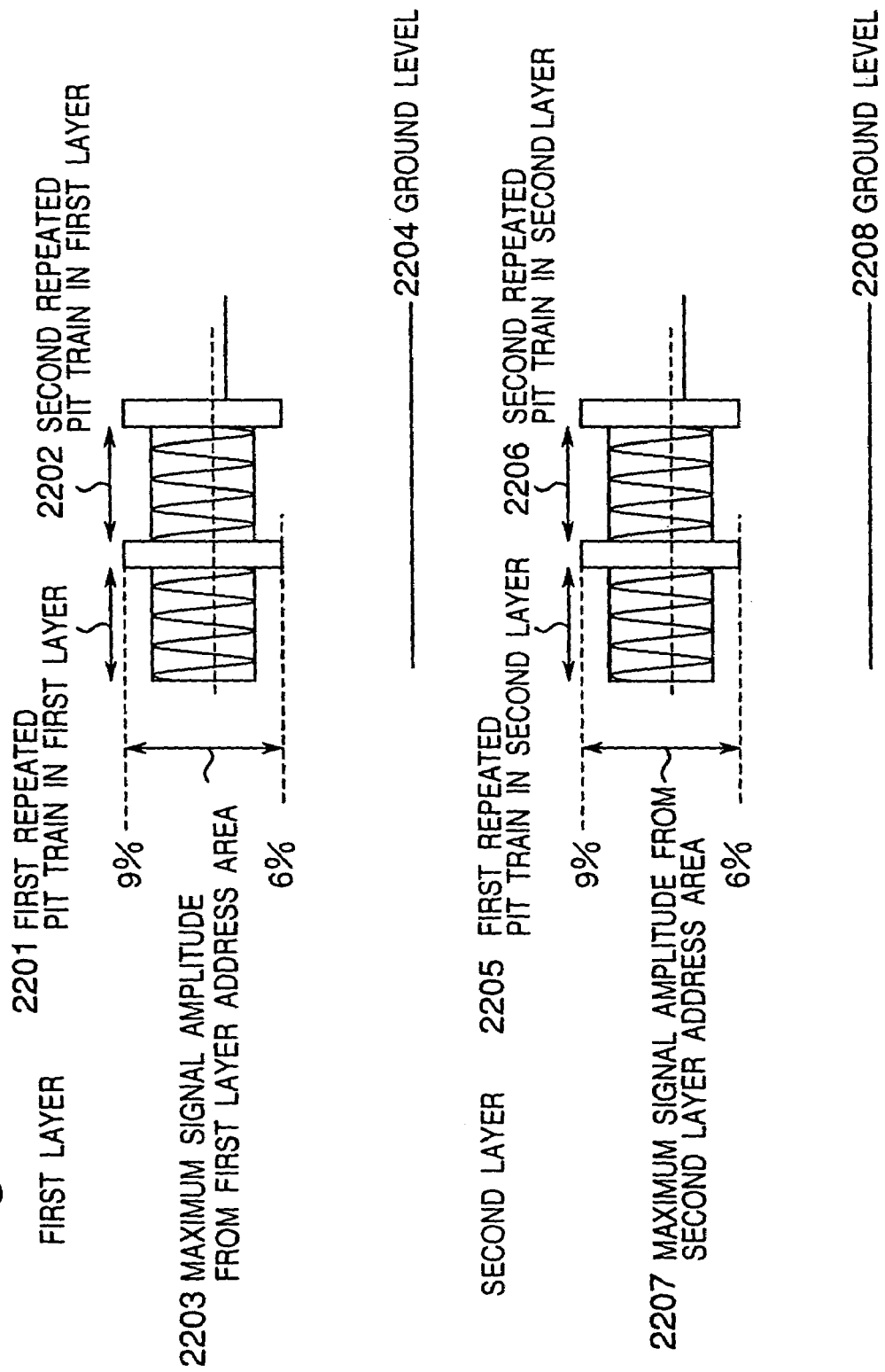
FIG. 22 describes the waveform after signal quality improvement by an optical disc drive according to a fifth embodiment of the present invention.

FIG. 21 shows an example for layer X on a disc with N data recording layers.

Embodiment 3

A third embodiment of the present invention is described next below with reference to the accompanying figures.

Figure 6:
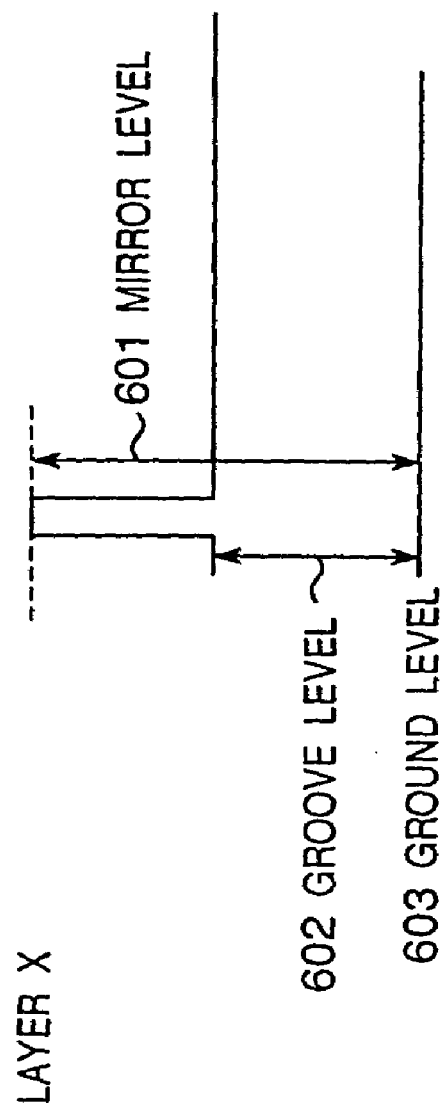
FIG. 6 describes convergence state detection means of an optical disc drive according to a third embodiment of the present invention.

The convergence detector 112 in this third embodiment detects light spot convergence using signals from unrecorded tracks in the data area, and is described with reference to FIG. 5 and FIG. 6. The configuration of the optical disc drive is identical to that of the first embodiment shown in FIG. 1.

In order to determine whether the light spot is focused on the first layer or second layer, the convergence detector 112 of the optical disc drive of the present invention holds the groove level 602, that is, the playback signal level from an unrecorded track in the data area. The light spot is focused on the first layer if the groove level is in a specific range (between threshold values 1*e* and 1*f*), and is focused on the second layer if the groove level is in another specific range (between threshold values 2*e* and 2*f*).

If there are three or more data recording layers, it is only necessary to define additional specific groove level voltage (threshold value) ranges. It will also be noted that threshold value range 1*e* to 1*f* and threshold value range 2*e* to 2*f* do not overlap.

As shown in FIG. 5, for example, if the groove level is in the range (1*e*–1*f*)=6%±Δ, the light spot is focused on the first layer. If it is in the range (2*e*–2*f*)=2.2%±Δ, the light spot is focused on the second layer. The convergence detector 112 makes this determination.

Alternatively, the convergence detector 112 in the optical disc drive of this invention can determine whether the light spot is focused on the first layer or second layer by holding the mirror level 601, which is the playback signal level from the mirror area of the disc. As shown in FIG. 8A, the mirror area is the flat area between the groove track 801 and the first pit train 803, and between the fast pit train 803 and second pit train 804.

The light spot is focused on the first layer if the mirror level is in one specific voltage range (between threshold values 1*g* and 1*h*), and is focused on the second layer if the mirror level is in another specific voltage range (between threshold values 2*g* and 2*h*).

Note that a mirror area is a mirror polished area of the disc where neither guide grooves or prepits are formed.

If the number of plural data recording layers is 3 or more, it is again also only necessary to define additional constant mirror level voltage ranges. It will also be noted that threshold value ranges 1*g* to 1*g* and 2*g* to 2*h* do not overlap.

As shown in FIG. 5, for example, if the mirror level is in the range (1*g*–1*h*)=9%±Δ, the light spot is focused on the first layer. If it is in the range (2*g*–2*h*)=3.3%±Δ, the light spot is focused on the second layer. The convergence detector 112 makes this determination.

As described above, the present invention can identify the data recording layer on which the light spot is focused in an optical disc having plural data recording layers based on a signal from an unrecorded track in the data area.

Embodiment 4

A fourth embodiment of the present invention is described next below with reference to the accompanying figures.

The convergence detector 112 in this fourth embodiment detects light spot convergence using signals from recorded tracks in the data area, and is described with reference to FIG. 7. The configuration of the optical disc drive is identical to that of the first embodiment shown in FIG. 1.

In FIG. 7 reference numerals 701 to 706 show the playback signal waveform from the mirror area and recording signal area (part of groove track 801 in FIG. 8) of the first layer, and reference numerals 707 to 712 show the playback signal waveform from the mirror area and recording signal area (part of groove track 801 in FIG. 8) of the second layer. Note that the recording signal envelope in the first layer is below the groove level 704. As will be dear from FIG. 3, this is because when a mark is written in the first layer (changing the phase change film of the disc from a crystalline to amorphous state), the reflectance drops from 9% to 3%. In the second layer, however, the recording signal envelope is above the groove level 710. This will also be clear from FIG. 3 because when a mark is written to the second layer, reflectance rises from 13% to 37%. This is because the composition of the phase change layer is different in the first and second layers.

How the convergence detector 112 in the optical disc drive of this embodiment determines whether the light spot is focused on the first layer or second layer is described below. How the convergence detector 112 determines that the light spot is focused on the first layer when the light spot is focused on the first layer is described first.

The convergence detector 112 holds the mirror-slice level voltage difference 702, which is the voltage difference between the recording signal slice level 703 (the median of the signal amplitude of the recording signal envelope, that is, the waveform of the playback signal from the data area recording track being read) and the voltage of the mirror level 701 signal (that is, a signal read from a flat mirror surface area where no guide grooves or prepits are formed).

If the mirror-slice level voltage difference 702 is in a specific range (between threshold values 1i and 1j), the light spot is focused on the first layer.

How the convergence detector 112 determines that the light spot is focused on the second layer when the light spot is focused on the second layer is described first.

The convergence detector 112 holds the mirror-slice level voltage difference 708, which is the voltage difference between the recording signal slice level 709 (the median of the signal amplitude of the recording signal envelope, that is, the waveform of the playback signal from the data area recording track being read) and the voltage of the mirror level 707 signal (that is, a signal read from a flat mirror surface area where there are no guide grooves or prepits).

If the mirror-slice level voltage difference 708 is in a specific range (between threshold values 2i and 2j), the light spot is focused on the second layer.

As in the previous embodiments, ranges 1i to 1j and 2i to 2j do not overlap.

As shown in FIG. 7, for example, if the mirror-slice level voltage difference is in the range $$(1i-1j)=4.95\%\pm\Delta,$$

the light spot is focused on the first layer. If it is in the range $$(2i-2j)=10\%\pm\Delta,$$

the light spot is focused on the second layer. The convergence detector 112 makes this determination.

The maximum recording signal level, which is the highest recording signal level, can be used in place of the recording signal slice level. Further alternatively, the minimum recording signal level, which is the lowest recording signal level can also be used in place of the recording signal slice level.

If the number of plural data recording layers is 3 or more, it is also only necessary to define additional constant mirror-slice level voltage difference ranges.

Alternatively, the convergence detector 112 in the optical disc drive of this invention can determine whether the light spot is focused on the first layer or second layer by holding the groove-slice voltage difference 706, which is the voltage difference between the recording signal slice level 703 (the median of the signal amplitude of the recording signal envelope, that is, the waveform of the playback signal from the data area recording track being read) and the groove level 704 voltage, that is, a signal read from an unrecorded guide groove. If the difference of the (recording signal slice level)−(groove level) is positive, the light spot is focused on the first layer; if negative, the light spot is focused on the second layer.

Depending upon the optical disc, the light spot may be focused on the first layer when the (recording signal slice level)−(groove level) difference is negative, and focused on the second layer when the difference is positive.

It will thus be known that the present invention can also determine from signals read from recorded tracks in the data area on which of plural data recording layers the light spot is focused.

Embodiment 5

A fifth embodiment of the present invention is described next below with reference to the accompanying figures. The second to fourth embodiments above describe a convergence detector 112 for discriminating between the first and second layers of an optical disc. The fifth to seventh embodiments below describe how to make signal output from the second layer identical to signal output from the first layer when the convergence detector 112 determines that the light spot is focused on the second layer.

This is described first with reference to FIG. 1.

The laser drive unit 113 is controlled to drive the semiconductor laser 102 at an output level optimized for the first layer when the convergence detector 112 determines that the light spot is focused on the first layer or it is not dear which layer the light spot is focused on.

If the convergence detector 112 determines that the light spot is focused on the second layer, the convergence detector 112 controls the laser drive unit 113 to drive the semiconductor laser 102 at an output level optimized for the second layer. In this case the laser drive unit 113 drives the semiconductor laser 102 at approximately 2.7 times the output power when the light spot is focused on the first layer. Why a value of 2.7 times is used is described below.

Scanning the address area with the light spot is described with reference to FIG. 9, referring specifically to scanning an address area in the first layer.

Reference numeral 901 is the playback signal waveform of the first pit train in the first layer, and reference numeral 902 is the playback signal waveform of the second pit train in the first layer. Reference numeral 903 indicates the maximum signal amplitude $\Delta AR1$ of the first layer address area, which in an optical disc with optical characteristics as shown in FIG. 3 is 3%. Reference numeral 904 indicates the ground level voltage. The maximum signal amplitude 505 of the first layer address area is also shown as $\Delta AR1=3\%$ in FIG. 5.

Scanning the address area of the second layer with a light spot emitted at the same laser power level used for the first layer instead of driving the laser drive unit 113 at 2.7 times the first layer power level is described next. Note that the maximum amplitude $\Delta AR2$ of the second layer address area is 1.1%, as also shown in FIG. 5 as the maximum signal amplitude 510 of the second layer address area. However, by multiplying laser power 2.7 times, the maximum amplitude $\Delta AR2$ of 1.1% can be increased to 3%. Therefore, when the convergence detector 112 shown in FIG. 1 according to this fifth embodiment determines that the light spot is focused on the second layer, the laser drive unit 113 drives the laser to output a light spot at 2.7 times the power level used when the light spot is focused on the first layer.

Reference numeral 905 in FIG. 9 shows the playback signal waveform of the first pit train in the second layer when the light spot is emitted at 2.7 times the first layer power level, and reference numeral 906 shows the playback signal waveform of the second pit train from the second layer. Reference numeral 907 shows the maximum signal amplitude of the second layer address area. When the convergence detector 112 detects that the light spot is focused on the second layer, the laser driver drives the semiconductor laser at 2.7 times the output level for the first layer, and the amount of light incident on the photodetector is therefore 2.7 times the light output of the first layer. The maximum signal amplitude ΔAR2 of the second layer address area is therefore 3%.

The maximum signal amplitude of the address area is therefore 3% in both the first and second layers, and playback signal quality is therefore improved in the first and second layer address areas.

It should be noted that while semiconductor laser output is increased 2.7 times when the light spot is focused on the second layer compared with when focused on the first layer, this increase is determined by the first layer crystalline reflectance, the second layer crystalline reflectance, and the first layer absorption.

This increase is also determined by the state of the recorded and unrecorded tracks of the first layer directly below the second layer.

It is further possible to restrict increase laser output 2.7 times to when the light spot is focused on the address areas of the second layer.

Yet further, the increase in laser output can be different in the data areas and address areas of the second layer.

Embodiment 6

A sixth embodiment of the present invention is described next below with reference to FIG. 11.

Figure 11:
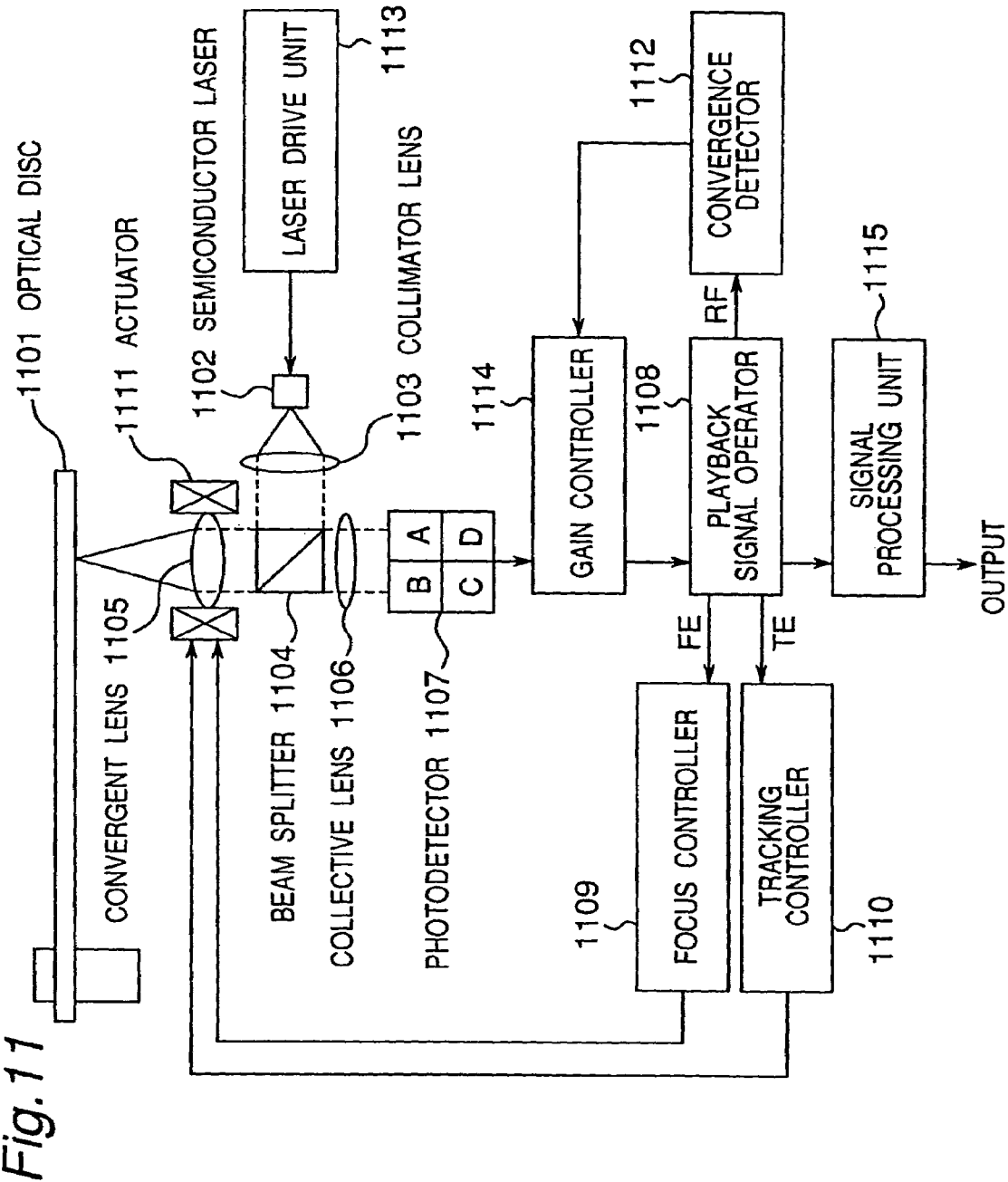
FIG. 11 is a graph used to describe an optical disc drive according to a sixth embodiment of the present invention.

Shown in FIG. 11 are an optical disc 1101, semiconductor laser 1102, collimator lens 1103, beam splitter 1104, convergent lens 1105, collective lens 1106, photodetector 1107, playback signal operating means 1108, focus controller 1109, tracking controller 1110, actuator 1111, convergence detector 1112, laser drive unit 1113, gain controller 1114, and signal processing unit 1115.

When the light spot is focused on the first layer or the focal point is undetermined, the convergence detector 1112 controls the gain controller 1114 so that the gain in the output voltage of the photodetector is optimized for the first layer.

When the light spot is focused on the second layer, the convergence detector 1112 controls the gain controller 1114 so that the gain in the output voltage of the photodetector is optimized for the second layer. In this case the convergence detector 1112 instructs the gain controller 1114 to set the gain in the output voltage of the photodetector 1107 to 2.7 times the gain when the light spot is focused on the first layer. Why 2.7 times the gain is used is as described in the fifth embodiment above.

The light spot scanning an address area in the first layer is described next.

Reference numeral 901 is the playback signal waveform of the first pit train in the first layer, and reference numeral 902 is the playback signal waveform of the second pit train in the first layer. Reference numeral 903 indicates the maximum signal amplitude ΔAR1 of the first layer address area, which in an optical disc with optical characteristics as shown in FIG. 3 is 3%. Reference numeral 904 indicates the ground level voltage.

The light spot scanning an address area in the second layer is described next.

FIG. 9 shows scanning the second layer at 2.7 times the light spot power emitted to the first layer. Reference numeral 905 shows the playback signal waveform of the first pit train in the second layer, and reference numeral 906 shows the playback signal waveform of the second pit train from the second layer. Reference numeral 907 shows the maximum signal amplitude of the second layer address area. When the convergence detector detects that the light spot is focused on the second layer, the laser driver is controlled so that the output voltage gain of the photodetector 1107 is 2.7 times the first layer gain, and the output voltage of the photodetector is therefore 2.7 times the output voltage when reading the first layer.

The maximum signal amplitude ΔAR2 of the second layer address area is therefore 3%.

The maximum signal amplitude is therefore 3% for signals read from the address areas of the first and second layers, and playback signal quality is therefore improved in the address areas of both the first and second layers.

It should be noted that the gain controller sets the output voltage gain of the photodetector when the light spot is focused on the second layer to 2.7 times the gain when the light spot is focused on the first layer, but this gain rate is determined by the first layer crystalline reflectance, the second layer crystalline reflectance, and the first layer absorption.

This gain rate is also determined by the state of the recorded and unrecorded tracks of the first layer directly below the second layer.

It is further possible to restrict increase the gain in photodetector output to 2.7 times to when the light spot is focused on the address areas of the second layer.

Yet further, the increase in photodetector gain can be different in the data areas and address areas of the second layer.

A seventh embodiment of the present invention is described next below with reference to FIG. 12.

Figure 12:
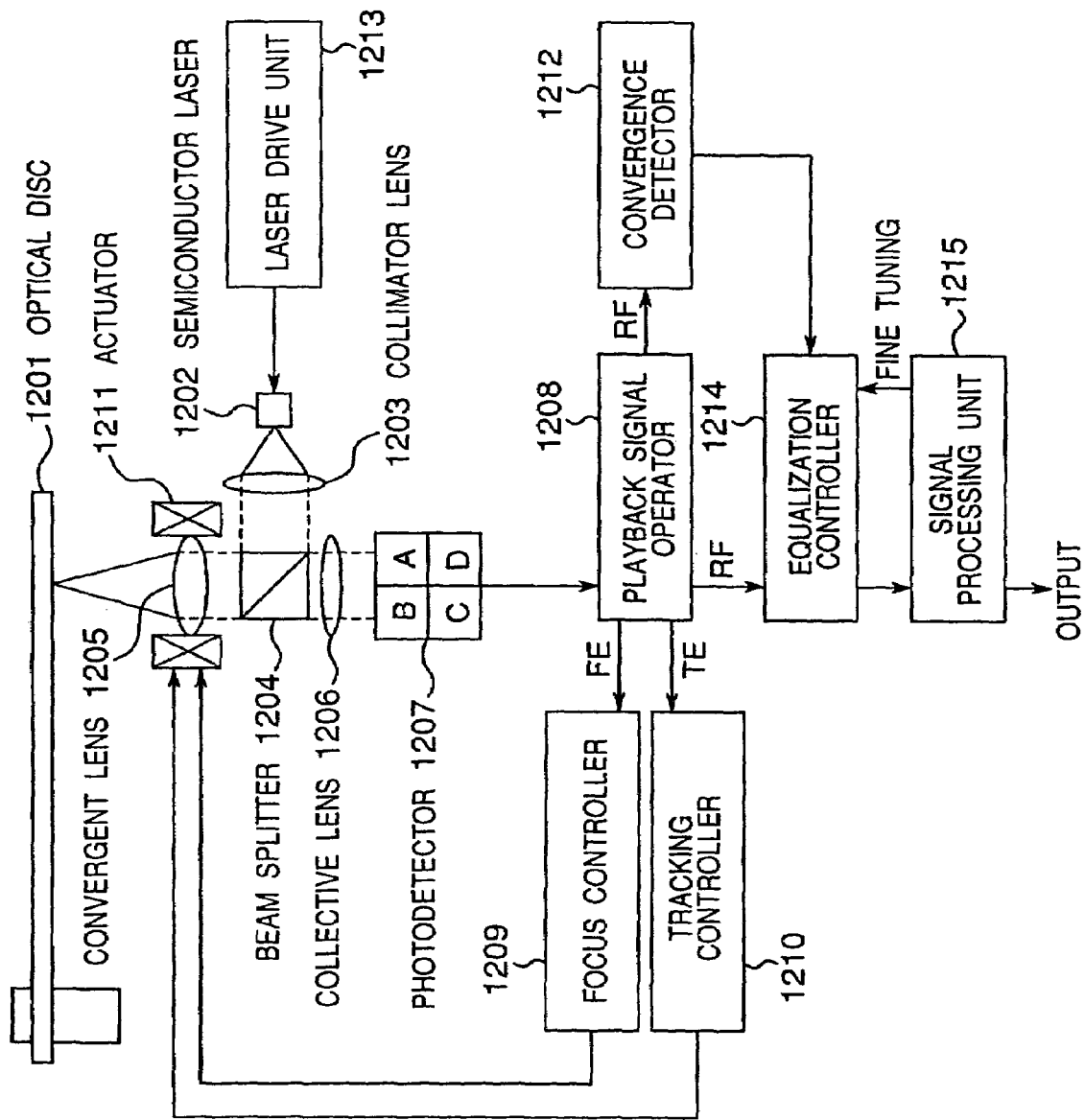
FIG. 12 is a graph used to describe an optical disc drive according to a seventh embodiment of the present invention.

Shown in FIG. 12 are optical disc 1201, semiconductor laser 1202, collimator lens 1203, beam splitter 1204, convergent lens 1205, collective lens 1206, photodetector 1207, playback signal operating means 1208, focus controller 1209, tracking controller 1210, actuator 1211, convergence detector 1212, laser drive unit 1213, equalization controller 1214, and signal processing unit 1215. The equalization controller is a device that can selectively increase the gain of a specific frequency component.

The output of the convergence detector 1212 is obtained by a method used by the convergence detector in the second, third, or fourth embodiment.

When the light spot is focused on the first layer or the focal point is undetermined, the convergence detector 1212 controls the equalization controller 1214 so that the output voltage of the playback signal operating means 1208 is equalized with equalization characteristics optimized for the first layer.

When the light spot is focused on the second layer, the convergence detector 1212 controls the equalization controller 1214 so that the output voltage of the playback signal operating means 1208 is equalized with equalization characteristics optimized for the second layer.

As shown in FIG. 16A, for example, the equalization controller 1214 is preset with two equalization curves. The first curve is set to achieve the greatest gain at frequency 1/2T and gain G1, and the other curve is set to achieve the greatest gain at frequency 1/2T and gain G2 where G1<G2. If the convergence detector 1212 detects that the light spot is focused on the first layer, one equalization curve is selected, and if the light spot is focused on the second layer, the other equalization curve is selected.

The equalization curves can alternatively be set as shown in FIG. 16B so that the greatest gain is achieved at frequency 1/2T and gain G1 on one curve, and at frequency 1/3T and gain G1 on the other curve.

It is also possible to tune the equalization characteristics after selecting the equalization curve. In this case the equalization controller 1214 outputs to the signal processing unit 1215, and the signal processing unit 1215 outputs the playback signal, but the equalization controller 1214 is then tuned based on jitter detected in the playback signal from the signal processing unit 1215. Tuning could also be based on the byte error rate (BER), resolution, or asymmetry instead of jitter.

The equalization characteristics for each layer are tuned by comparing the index (such as jitter, BER, resolution, asymmetry) of playback signal quality with a specific threshold value.

Jitter is a time shift from the playback signal of the original signal, and if the recording conditions are equal, low jitter generally indicates that playback is more accurate. Therefore, if jitter is less than or equal to a specific threshold value, best equalization characteristic has been achieved.

The BER indicates the error rate in the playback signal, and a low BER generally indicates accurate playback. Therefore, if the BER is less than or equal to a specific threshold value, the best equalization characteristic has been achieved.

Resolution is the ratio between the amplitude of the signal with the shortest or proportionately shortest time interval in the playback signal, and the amplitude of the signal with the longest or proportionately longest time interval in the playback signal, and if the recording conditions are equal, high resolution generally indicates that playback is more accurate. Therefore, if resolution is greater than or equal to a specific threshold value, the best equalization characteristic has been achieved.

Asymmetry is a value indicative of the second harmonic component of the playback signal, and if the recording conditions are equal, lower asymmetry generally indicates that playback is more accurate. Therefore, if asymmetry is less than or equal to a specific threshold value, the best equalization characteristic has been achieved.

It will also be obvious that while jitter, byte error rate, resolution, and asymmetry are used as indices of playback signal quality above, other indices may also be used, including signal amplitude, C/N, and the bit error rate.

It should also be noted that different equalization characteristics can be set for the data areas and address areas of the same data recording layer.

The seventh embodiment of the invention as described above can thus improve playback signal characteristics in the address areas or data areas in each data recording layer, and can significantly improve the quality of playback signals from the address areas and data areas of the optical disc.

Embodiment 8

Figure 13:
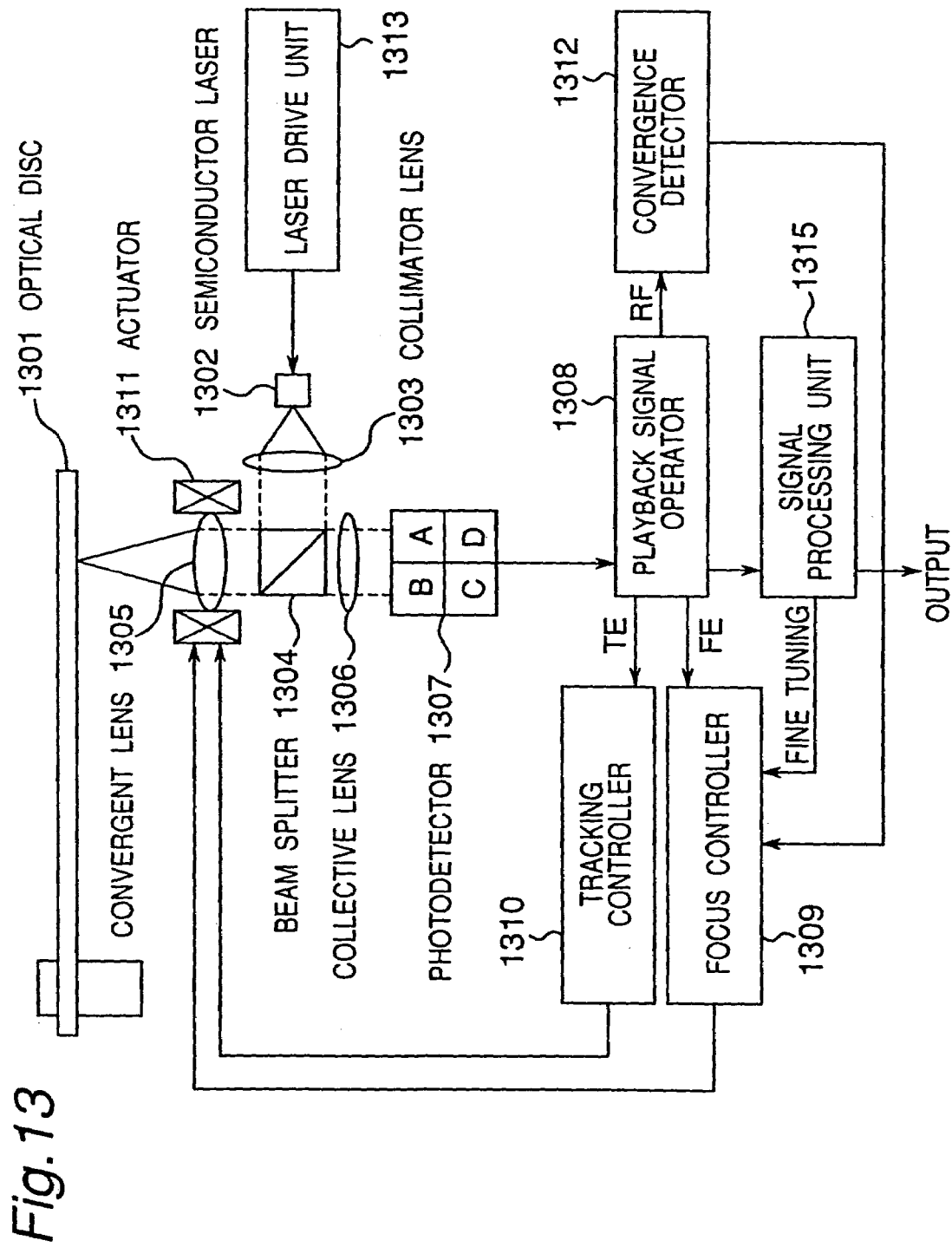
FIG. 13 is a graph used to describe an optical disc drive according to a eighth embodiment of the present invention.

An eighth embodiment of the present invention is described next below with reference to FIG. 13. Shown in FIG. 13 are optical disc 1301, semiconductor laser 1302, collimator lens 1303, beam splitter 1304, convergent lens 1305, collective lens 1306, photodetector 1307, playback signal operating means 1308, focus controller 1309, tracking controller 1310, actuator 1311, convergence detector 1312, laser drive unit 1313, and signal processing unit 1315.

The output of the convergence detector 1312 is obtained by a method used by the convergence detector in the second, third, or fourth embodiment.

When the light spot is focused on the first layer or the focal point is undetermined, the convergence detector 1312 controls the focus controller 1309 to optimize the focal point of the light spot on the first layer.

When the light spot is focused on the second layer, the convergence detector 1312 controls the focus controller 1309 to optimize the focal point of the light spot on the second layer.

Figure 17:
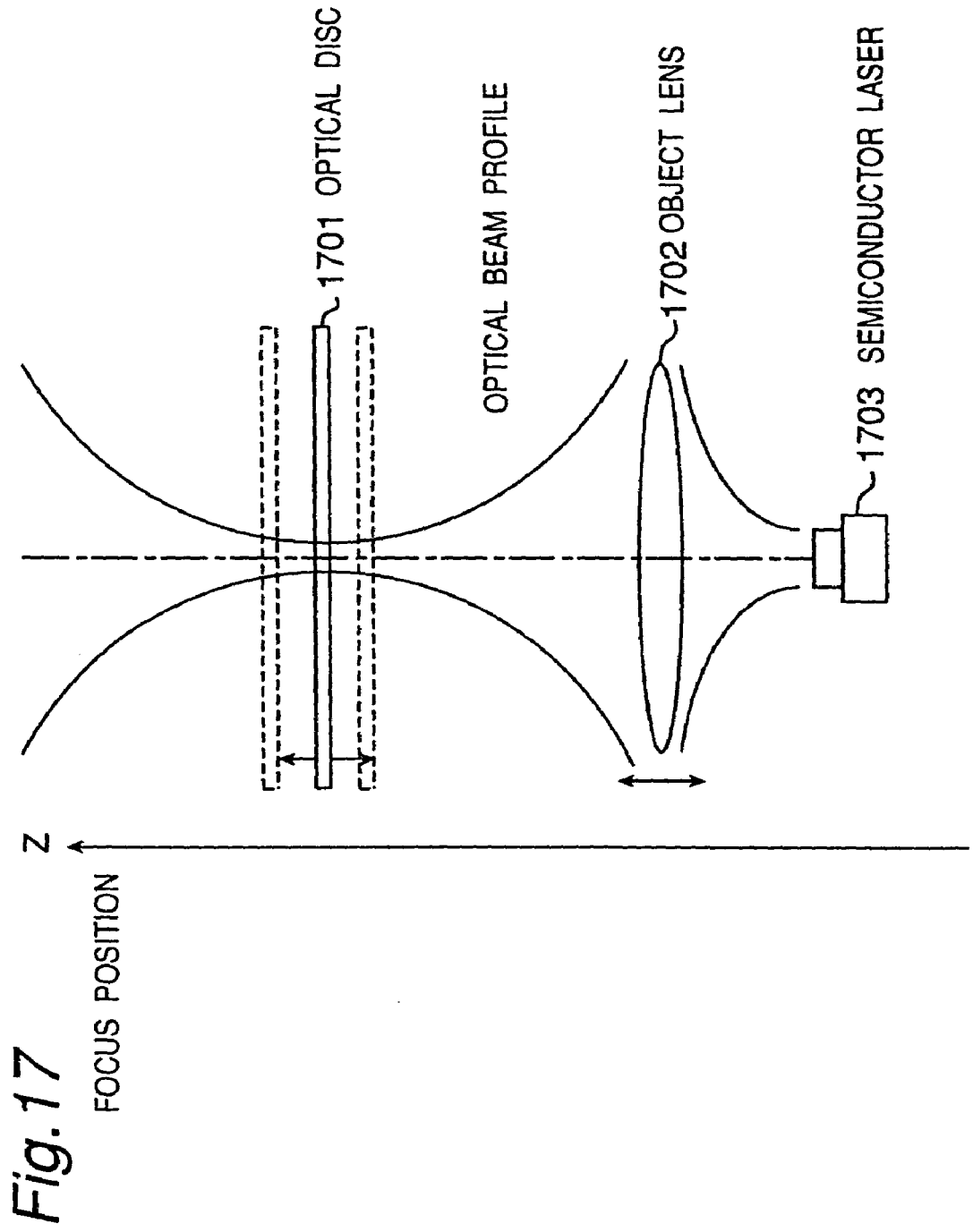
FIG. 17 is used to describe a focusing position in an eighth embodiment of the present invention.

When the beam profile is seen in section as shown in FIG. 17, the focal point is optimized when the narrowest part of the beam (the beam waist) is perpendicular to, or perpendicularly intersects, the data recording layer of the optical disc. After thus selecting the focal point, the focal point can be further tuned. The playback signal operating means 1308 outputs to the signal processing unit 1315, which in turn outputs the playback signal. The focal point can be tuned by detecting jitter in the playback signal and then adjusting the focus controller 1309 based on the detected jitter. Tuning could also be based on the byte error rate (BER), resolution, or asymmetry instead of jitter.

The focal point for each layer can be tuned by comparing the index (such as jitter, BER, resolution, asymmetry) of playback signal quality with a specific threshold value.

Jitter is a time shift from the playback signal of the original signal, and if the recording conditions are equal, low jitter generally indicates that playback is more accurate. Therefore, if jitter is less than or equal to a specific threshold value, the best focal point has been achieved.

The BER indicates the error rate in the playback signal, and a low BER generally indicates accurate playback Therefore, if the BER is less than or equal to a specific threshold value, the best focal point has been achieved.

Resolution is the ratio between the amplitude of the signal with the shortest or proportionately shortest time interval in the playback signal, and the amplitude of the signal with the longest or proportionately longest time interval in the playback signal, and if the recording conditions are equal, high resolution generally indicates that playback is more accurate. Therefore, if resolution is greater than or equal to a specific threshold value, the best focal point has been achieved.

Asymmetry is a value indicative of the second harmonic component of the playback signal, and if the recording conditions are equal, lower asymmetry generally indicates that playback is more accurate. Therefore, if asymmetry is less than or equal to a specific threshold value, the best focal point has been achieved.

It will also be obvious that while jitter, byte error rate, resolution, and asymmetry are used as indices of playback signal quality above, other indices may also be used, including signal amplitude, C/N, and the bit error rate.

It should also be noted that different focal points can be set for the data areas and address areas of the same data recording layer.

This embodiment of the invention as described above can thus improve playback signal characteristics in the address areas or data areas in each data recording layer, and can significantly improve the quality of playback signals from the address areas and data areas of the optical disc.

Embodiment 9

A ninth embodiment of the present invention is described next below with reference to FIG. 14.

Figure 14:
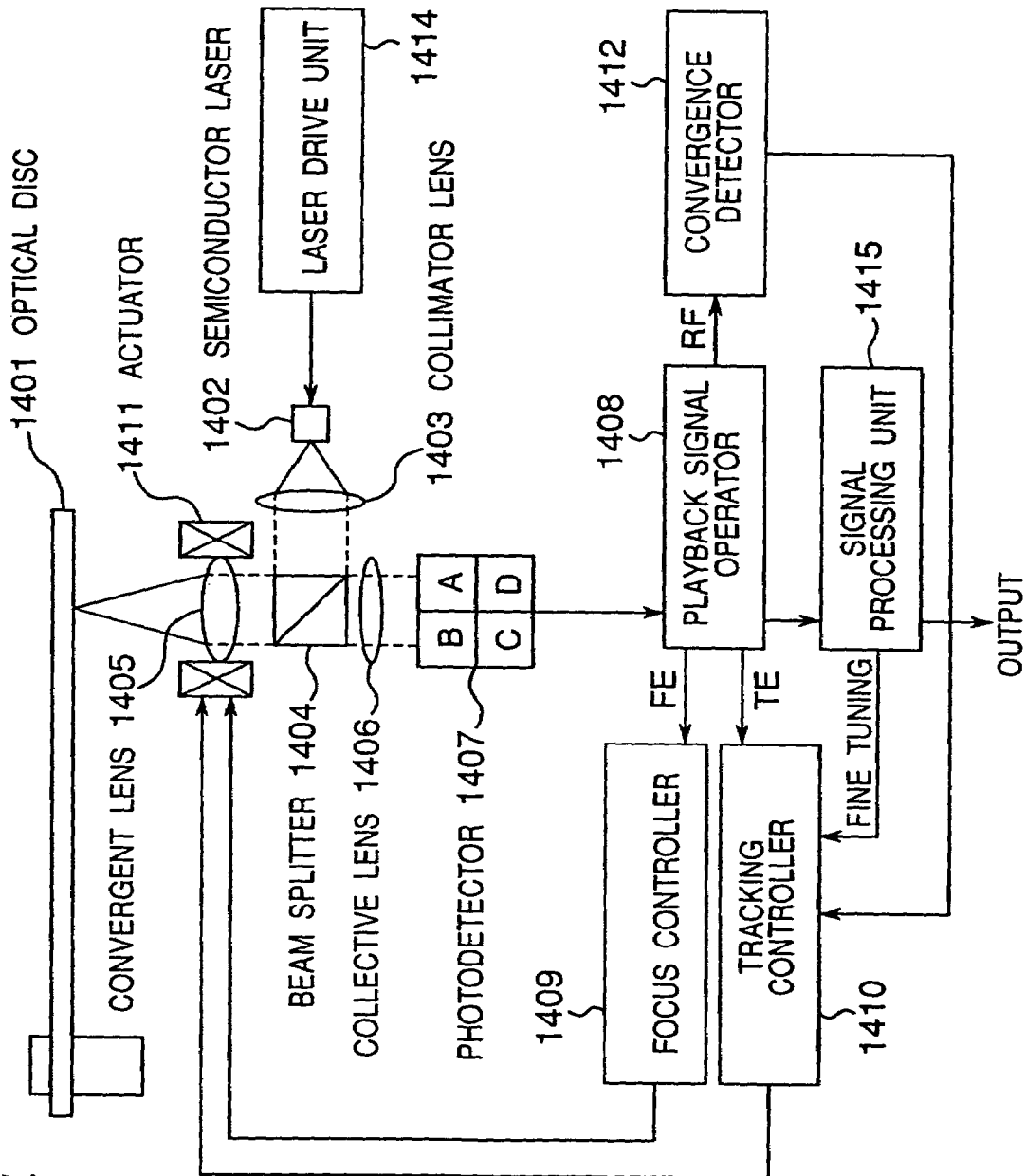
FIG. 14 is a graph used to describe an optical disc drive according to a ninth embodiment of the present invention.

Shown in FIG. 14 are optical disc 1401, semiconductor laser 1402, collimator lens 1403, beam splitter 1404, convergent lens 1405, collective lens 1406, photodetector 1407, playback signal operating means 1408, focus controller 1409, tracking controller 1410, actuator 1411, convergence detector 1412, laser drive unit 1414, and signal processing unit 1415.

The output of the convergence detector 1412 is obtained by a method used by the convergence detector in the second, third, or fourth embodiment.

When the light spot is focused on the first layer or the focal point is undetermined, the convergence detector 1412 controls the tracking controller 1410 to optimize the tracking position of the light spot on the first layer.

When the light spot is focused on the second layer, the convergence detector 1412 controls the tracking controller 1410 to optimize the tracking position of the light spot on the second layer.

Figure 18:
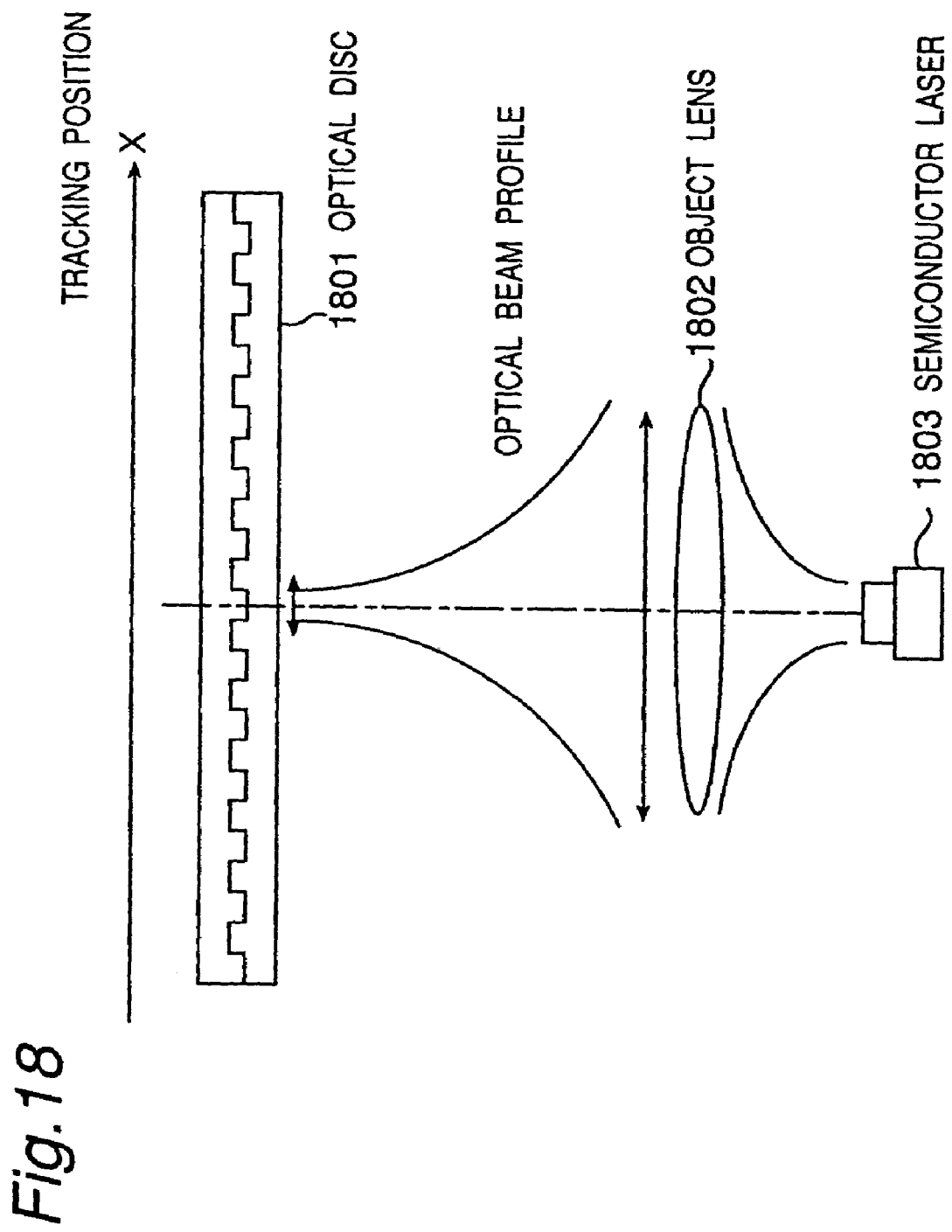
FIG. 18 is used to describe a tracking position in a ninth embodiment of the present invention.

When the beam profile is seen in section as shown in FIG. 18, the tracking position refers to the location of the narrowest part of the beam (the beam waist) relative to the track in the direction crossing the track radially to the optical disc. After thus selecting the tracking position, the tracking position can be further tuned The playback signal operating means 1408 outputs to the signal processing unit 1415, which in turn outputs the playback signal. The tracking position can be tuned by detecting jitter in the playback signal and then adjusting the tracking controller 1410 based on the detected jitter. Tuning could also be based on the byte error rate (BER), resolution, or asymmetry instead of jitter.

The tracking position for each layer can be tuned by comparing the index (such as jitter, BER, resolution, asymmetry) of playback signal quality with a specific threshold value.

Jitter is a time shift from the playback signal of the original signal, and if the recording conditions are equal, low jitter generally indicates that playback is more accurate. Therefore, if jitter is less than or equal to a specific threshold value, the best tracking position has been achieved.

The BER indicates the error rate in the playback signal, and a low BER generally indicates accurate playback. Therefore, if the BER is less than or equal to a specific threshold value, the best tracking position has been achieved.

Resolution is the ratio between the amplitude of the signal with the shortest or proportionately shortest time interval in the playback signal, and the amplitude of the signal with the longest or proportionately longest time interval in the playback signal, and if the recording conditions are equal, high resolution generally indicates that playback is more accurate. Therefore, if resolution is greater than or equal to a specific threshold value, the best tracking position has been achieved.

Asymmetry is a value indicative of the second harmonic component of the playback signal, and if the recording conditions are equal, lower asymmetry generally indicates that playback is more accurate. Therefore, if asymmetry is less than or equal to a specific threshold value, the best tracking position has been achieved.

It will also be obvious that while jitter, byte error rate, resolution, and asymmetry are used as indices of playback signal quality above, other indices may also be used, including signal amplitude, C/N, and the bit error rate.

It should also be noted that different tracking positions can be set for the data areas and address areas of the same data recording layer.

This embodiment of the invention as described above can thus improve playback signal characteristics in the address areas or data areas in each data recording layer, and can significantly improve the quality of playback signals from the address areas and data areas of the optical disc.

Embodiment 10

Figure 15:
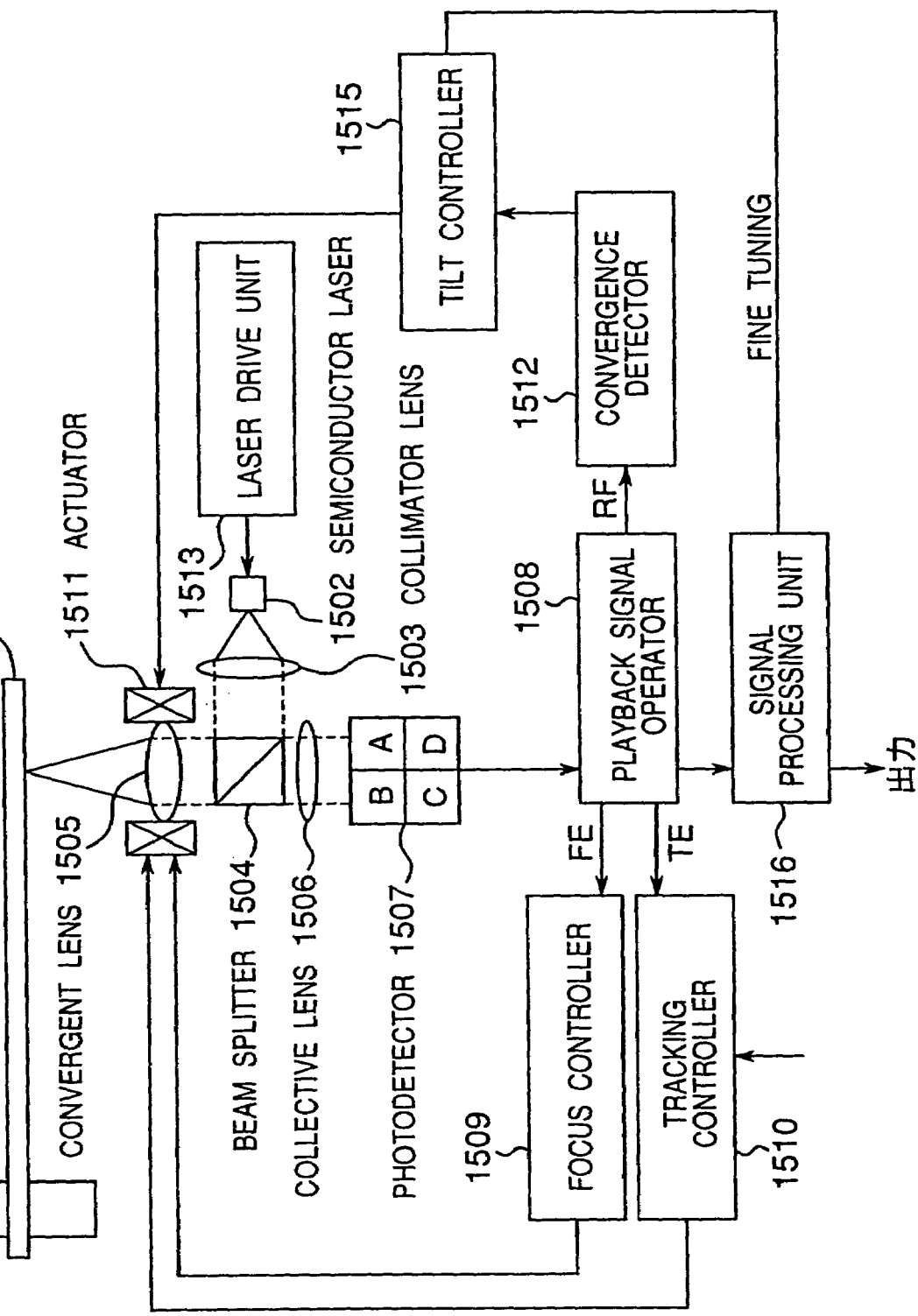
FIG. 15 is a graph used to describe an optical disc drive according to a tenth embodiment of the present invention.

A tenth embodiment of the present invention is described next below with reference to FIG. 15. Shown in FIG. 15 are optical disc 1501, semiconductor laser 1502, collimator lens 1503, beam splitter 1504, convergent lens 1505, collective lens 1506, photodetector 1507, playback signal operating means 1508, focus controller 1509, tracking controller 1510, actuator 1511, convergence detector 1512, laser drive unit 1513, tilt controller 1515, and signal processing unit 1516.

The output of the convergence detector 1512 is obtained by a method used by the convergence detector in the second, third, or fourth embodiment.

When the light spot is focused on the first layer or the focal point is undetermined, the convergence detector 1512 controls the tilt controller 1515 to optimize the tilt position of the light spot for the first layer.

When the light spot is focused on the second layer, the convergence detector 1512 controls the tilt controller 1515 to optimize the tilt position of the light spot for the second layer.

The tilt position refers to the angle between the optical axis of the laser beam and the data recording layer of the optical disc. After thus selecting the tilt position, the tilt position can be further tuned. The playback signal operating means 1508 outputs to the signal processing unit 1516, which in turn outputs the playback signal. The tracking position can be tuned by detecting jitter in the playback signal and then adjusting the tilt controller 1515 based on the detected jitter. Tuning could also be based on the byte error rate (BER), resolution, or asymmetry instead of jitter.

There are two types of tilt: radial tilt (R tilt) and tangential tilt (T tilt). Radial tilt is tilt in the direction orthogonal to the track and radial to the disc. Tangential tilt is tilt in the direction parallel or tangential to the track.

Figure 19:
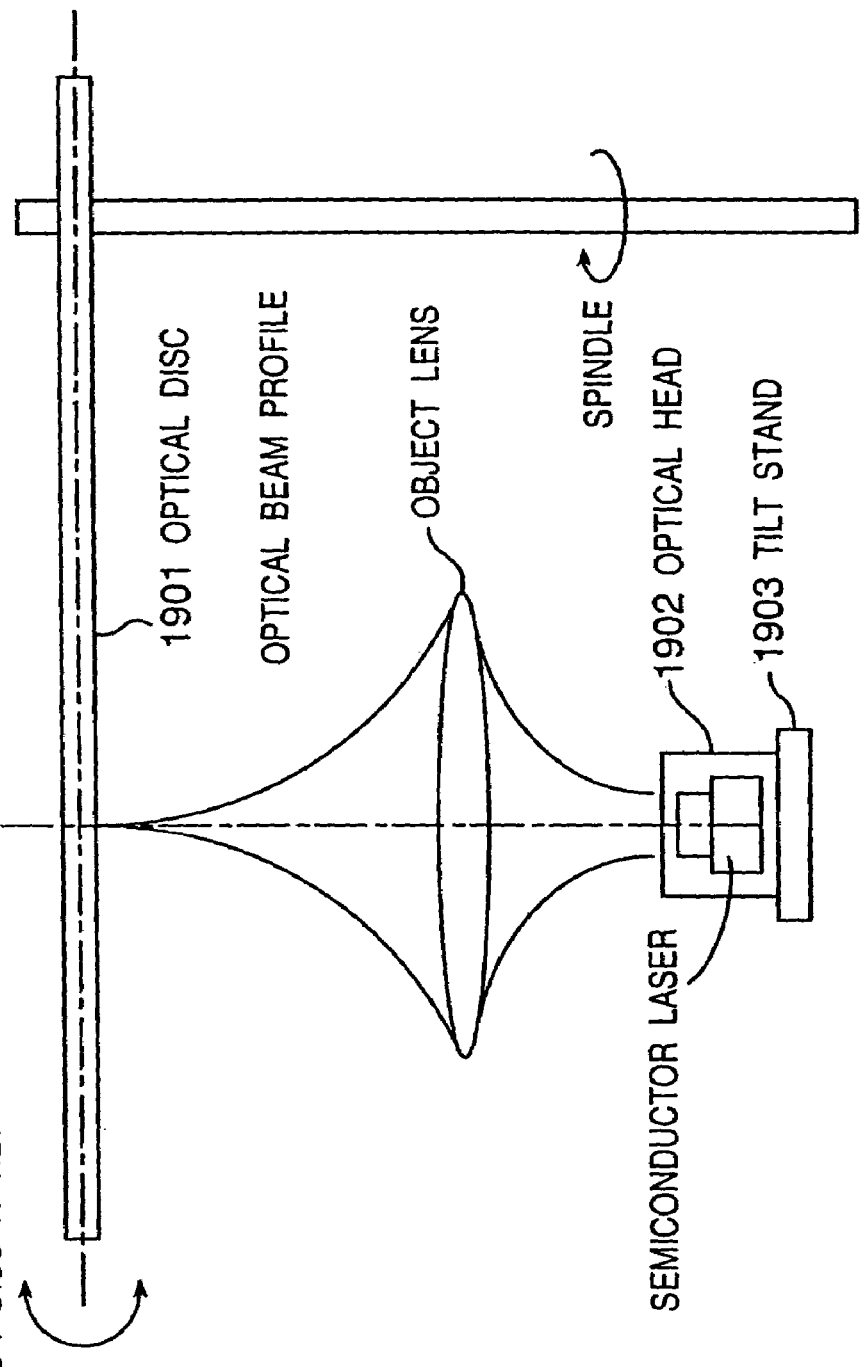
FIG. 19 is used to describe radial tilt in a tenth embodiment of the present invention.

Radial tilt is further described with reference to FIG. 19 in which are shown optical disc 1901, optical head 1902, and tilt stand 1903. There are two types of radial tilt: disc R tilt 1904 resulting from disc warping and fluctuations in the data surface due to disc rotation, and drive R tilt 1905. Drive R tilt 1905 results from optical head mounting error or biasing of the tilt stand causing the recording surface of the optical disc 1901 to be tilted relative to the optical axis of the light beam. There is no practical need to differentiate between disc R tilt and drive R tilt, and both are collectively referred to as R tilt.

Figure 20:
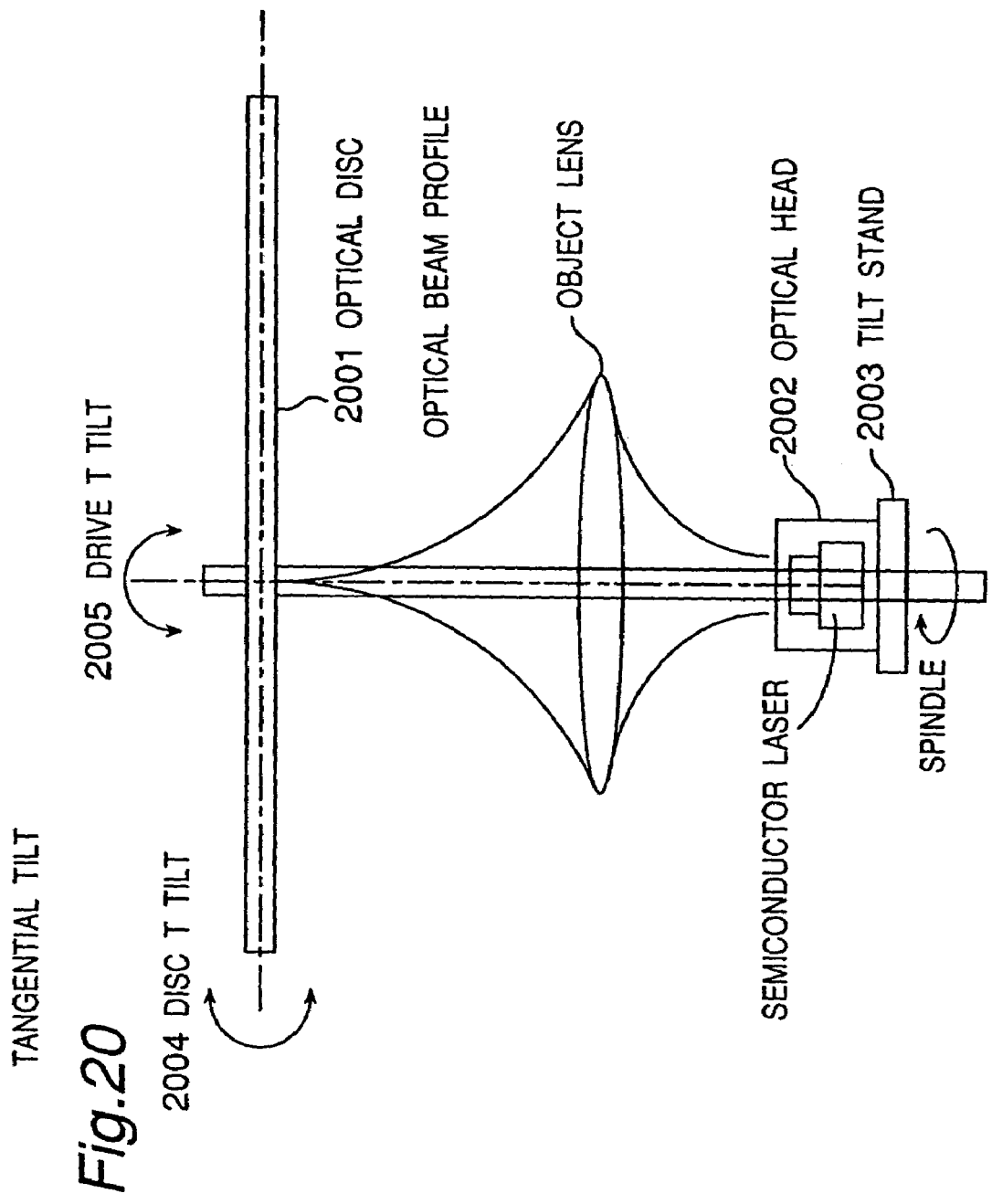
FIG. 20 is used to describe a tangential tilt of an optical disc in a second embodiment of the present invention.

Tangential tilt (T tilt) is further described with reference to FIG. 20 in which are shown optical disc 2001, optical head 2002, and tilt stand 2003. There are also two types of tangential tilt, disc T tilt 2004 and drive T tilt 2005. Disc T tilt 2004 results from disc rotation vibrations and error in the disc surface precision.

Drive T tilt 2005 results from optical head mounting error or biasing of the tilt stand causing the recording surface of the optical disc 2001 to be tilted relative to the optical axis of the light beam. There is no practical need to differentiate between disc T tilt and drive T tilt, and both are collectively referred to as T tilt.

The R and T tilt positions for each layer can be tuned by comparing the index (such as jitter, BER, resolution, asymmetry) of playback signal quality with a specific threshold value.

Jitter is a time shift from the playback signal of the original signal, and if the recording conditions are equal, low jitter generally indicates that playback is more accurate. Therefore, if jitter is less than or equal to a specific threshold value, the best R and T tilt positions have been achieved.

The BER indicates the error rate in the playback signal, and a low BER generally indicates accurate playback. Therefore, if the BER is less than or equal to a specific threshold value, the best R and T tilt positions have been achieved.

Resolution is the ratio between the amplitude of the signal with the shortest or proportionately shortest time interval in the playback signal, and the amplitude of the signal with the longest or proportionately longest time interval in the playback signal, and if the recording conditions are equal, high resolution generally indicates that playback is more accurate. Therefore, if resolution is greater than or equal to a specific threshold value, the best R and T tilt positions have been achieved.

Asymmetry is a value indicative of the second harmonic component of the playback signal, and if the recording conditions are equal, lower asymmetry generally indicates that playback is more accurate. Therefore, for determining whether or not the optimum tracking position is obtained, if asymmetry is less than or equal to a specific threshold value, it is so determined that the best R and T tilt positions have been achieved.

It will also be obvious that while jitter, byte error rate, resolution, and asymmetry are used as indices of playback signal quality above, other indices may also be used, including signal amplitude, C/N, and the bit error rate.

This embodiment of the invention as described above can thus improve playback signal characteristics in the address areas or data areas in each data recording layer, and can significantly improve the quality of playback signals from the address areas and data areas of the optical disc.

As will be known from the preceding descriptions of an optical disc, optical disc drive, and optical disc playback method according to the present invention, which of plural data recording layers the light spot is focused on in an optical disc having a plurality of data recording layers can be determined irrespective of whether the data area is recorded or blank. Playback signal quality in the address areas and data areas can therefore be improved in each of the plural data recording layers, and it is therefore possible to significantly improve signal quality when reading from both the address areas and data areas of the optical disc.

Embodiment 11

Figure 23:
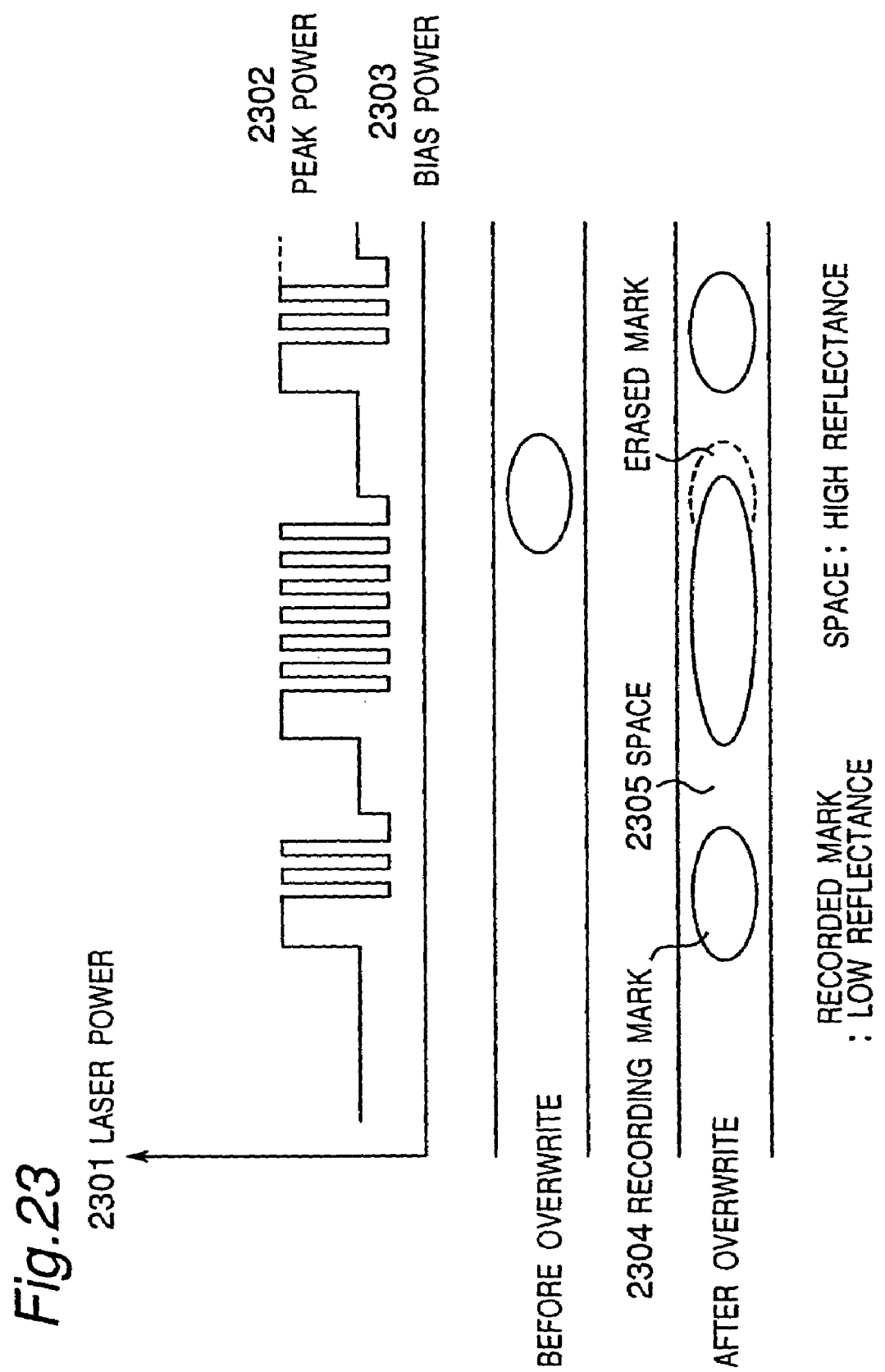
FIG. 23 is used to describe signal recording and playback by an optical disc drive according to the prior art.

The recording principle of a phase change optical disc is described next with reference to FIG. 23.

A disc recorder for phase change media records and erases data by emitting a laser beam to a recording thin film of the disc in order to heat the phase change material of the thin film and thereby effect a change in the crystalline phase of the film. The y-axis in FIG. 23 shows laser power, and the x-axis shows the time base or a location on the rotating disc. The semiconductor laser is primarily driven at a peak power 2302 level causing crystalline parts to change to an amorphous state, or a bias power 2303 level causing amorphous parts to change to a crystalline state. By emitting the semiconductor laser to the recording layer of the disc while modulating laser power between peak power 2302 and bias power 2303, an appropriate sequence of recording marks (amorphous parts) 2304 and spaces 2305 (crystalline parts) between the marks 2304 is formed on the optical disc. As described above, reflectance differs in the recorded marks and spaces. This difference in mark and space reflectance is detected from the light spot focused on the optical disc, and processed to read information.

Heat interference between adjacent recording marks in conjunction with high density recording can cause recorded mark length to shift from the normal position in the recording signal. This problem is addressed by various adaptive recording compensation technologies, one of which is described with reference to FIG. 24.

Figure 24:
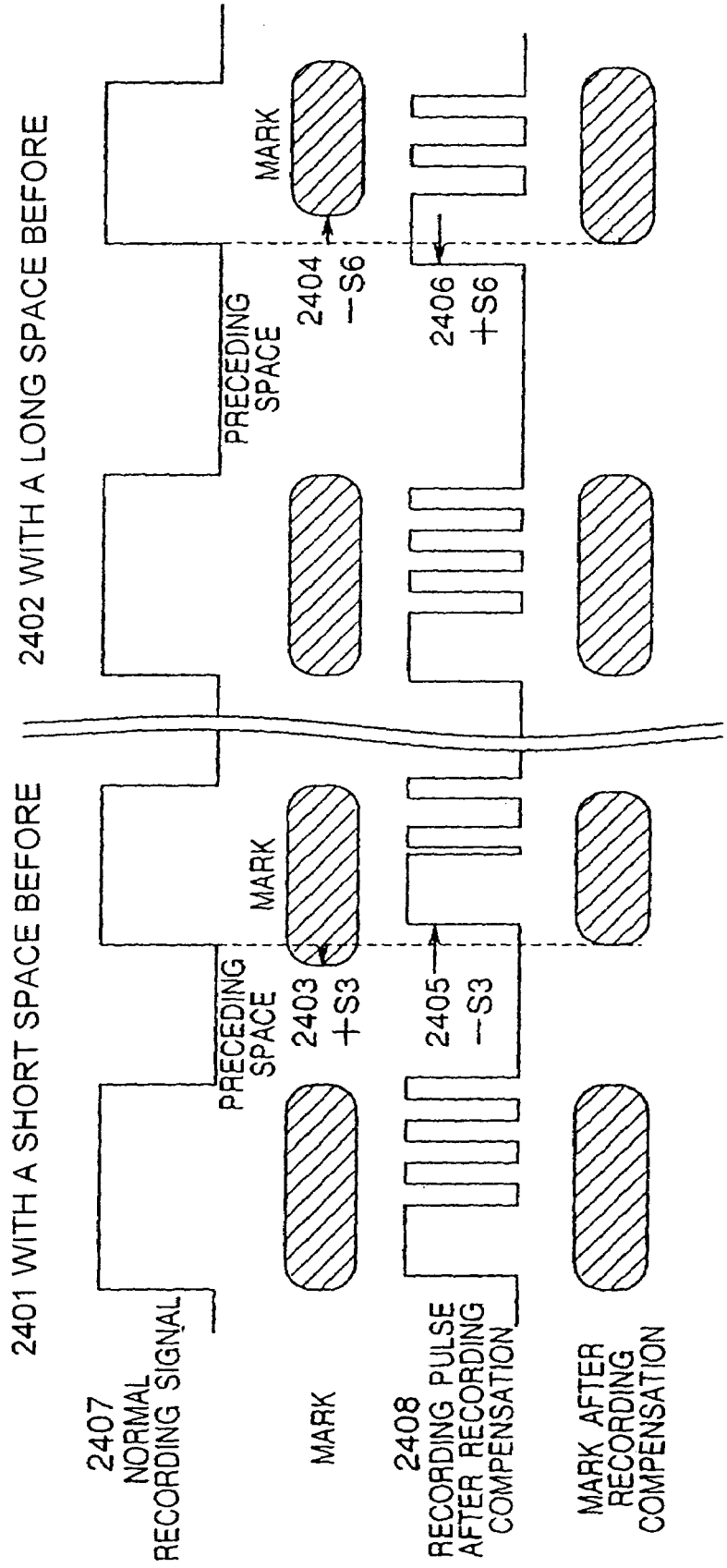
FIG. 24 is used to describe signal recording and playback by an optical disc drive according to the prior art.

In FIG. 24 reference numeral 2401 shows a case in which the previous space is short, and reference numeral 2402 shows a case in which the previous space is long. If the previous space is short and data is recorded with a normal recording signal 2407, heat interference causes the leading edge of the recorded mark to shift +S3 2403 from the normal mark edge position, resulting in a longer mark. To compensate for this the position of the first pulse in the recording pulse train is delayed −S3 2405 so that the mark is recorded to the normal position after recording compensation 2408.

Similarly when the previous space is long and data is recorded with a normal recording signal 2407, heat interference causes the leading edge of the recorded mark to shift −S6 2404 from the normal mark edge position, resulting in a shorter mark. To compensate for this the position of the first pulse in the recording pulse train is advanced +S6 2406 so that the mark is recorded to the normal position after recording compensation 2408.

These recording compensation techniques thus suppress interference during playback between marks and spaces of different lengths, and make it possible to improve signal quality.

Figure 25:
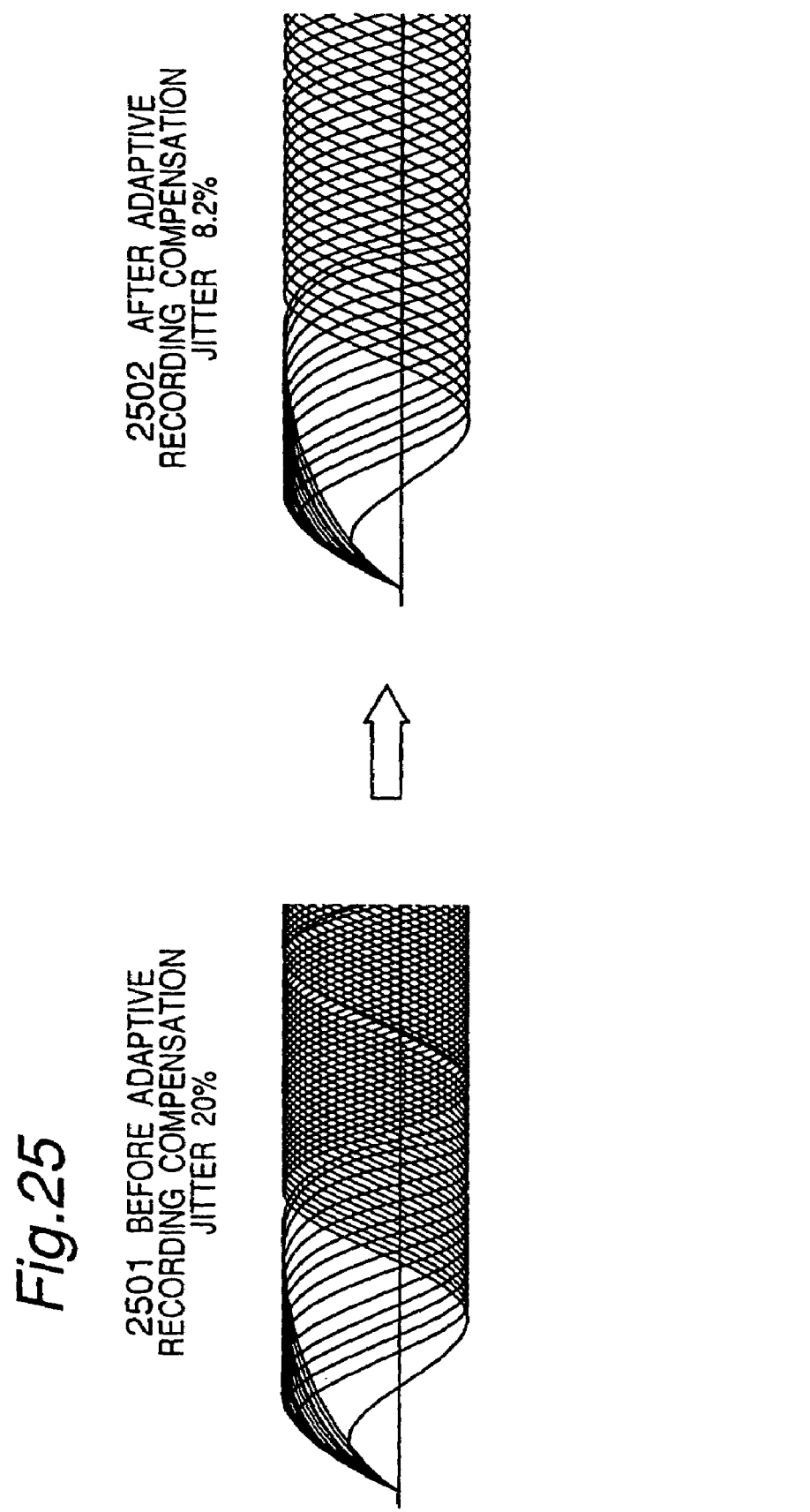
FIG. 25 shows experimental results from recording and playback by an optical disc drive according to the prior art.

FIG. 25 is an eye pattern of the recording signal when this recording compensation technique is used. It will be known from the figure that a dear eye is opened by applying this adaptive recording compensation technique. Land and groove recording technologies record marks and spaces to both the land and groove tracks of the guide grooves on the disc.

Problems associated with the prior art technologies noted above are described below. Conventional double-sided optical recording media are designed such that recorded data is read and data is recorded to the disc by emitting laser beams to the disc from both above and below the disc. There is therefore little space for printing a label identifying the recorded content (disc), and handling the discs is thus difficult. Furthermore, if double-sided media is played in a drive with only one optical head, the disc must be removed from the drive, turned over, and reloaded in order to play the other side, and continuous, uninterrupted playback of all recorded content is therefore not possible. To automate reading both sides of the disc it is necessary to provide two optical heads, one on each side of the disc. This increases disc player size and cost.

Figure 26:
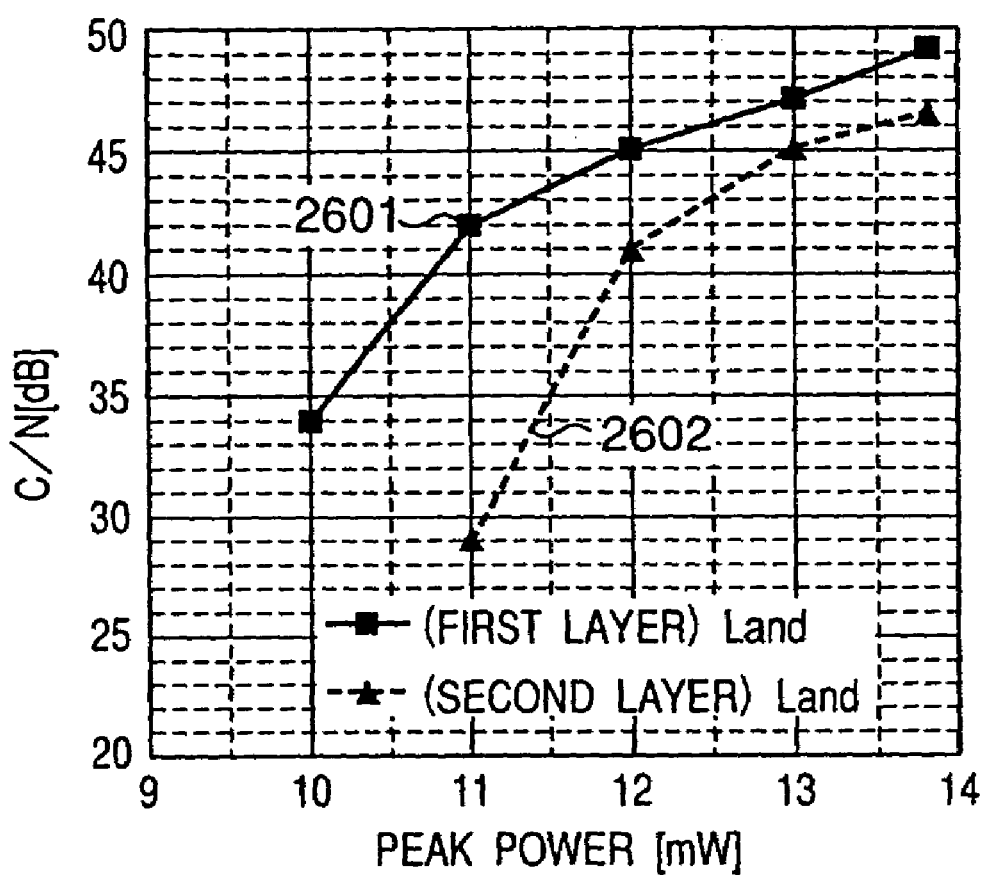
FIG. 26 shows experimental results from recording and playback by an optical disc drive according to an eleventh embodiment of the present invention.

The recording and playback characteristics of signals recorded to an optical disc having optical characteristics as shown in FIG. 3 are described next. FIG. 26 is a graph of test measurements taken with a sample optical disc produced with the optical characteristics shown in FIG. 3. FIG. 26 shows peak power used to change the phase change material from crystalline to amorphous state on the x-axis, and the C/N ratio of the playback signal on the y-axis.

A phase change recording film was formed on two 0.58 mm thick substrates, which were then bonded with a 0.04 mm thick adhesive layer therebetween to form the optical disc. Laser power was changed while recording to each recording layer to form recording marks. The recording marks were then reproduced, and the C/N ratio of the playback signal measured. The results are shown in FIG. 26.

Curve 2601 shows the C/N ratio when data recorded to the first recording layer was reproduced. Curve 2602 shows the C/N ratio when data recorded to the second recording layer was reproduced.

When recording data to disc, disc surface wobble and eccentricity, and external impact or vibration on the recorder, cause defocusing and tracking error, thus resulting in a degraded C/N ratio in the recording signal. Tilt, that is, deviation in the angle between the disc and optical axis of the light beam, also degrades the C/N ratio of the recording signal. Disc warping is also affected by humidity and other environmental factors. The optical head is also affected by variations resulting from the manufacturing process as well as aging. Considering C/N ratio degradation resulting from these and other factors, 45 dB is the practical limit for the C/N ratio of the recording signal if data recorded to disc is to be recorded and reproduced reliably.

The following conclusions can be drawn from FIG. 26. A C/N ratio of 45 dB or more is achieved on the first data recording layer at a peak power of 12 mW or greater, and is achieved on the second data recording layer with a peak power of 13 mW or more. This shows that recording sensitivity is different on the first and second data recording layers.

FIG. 26 also indicates that increasing the peak power should increase the C/N ratio for both recording layers.

However, increasing the peak power of the laser shortens the service life of the laser, increases power consumption, and increases accumulation of recording film damage in the recording film through repeated recording. It is therefore desirable to set the recording power as low as possible.

Therefore, to avoid these problems and assure good signal quality in each recording layer, the peak power level of the recording laser must be set separately for the first recording layer and the second recording layer.

Determining the peak power is described next. The peak power can be determined by recording a signal containing a repeated sequence of the shortest marks and spaces in the recording data, and measuring the C/N ratio of the recorded signal.

For example, the peak power is set to the peak power achieving a C/N ratio of 50 dB in the recorded signal. The desirable peak power achieving this C/N ratio is learned for both the first and second recording layers.

Instead of using the C/N ratio, peak power could alternatively be set by measuring jitter in the recording signal. In this case the peak power is determined by measuring jitter in a recorded signal containing a randomized pattern of marks and spaces.

The peak power settings learned for each of the recording layers are then stored. When data is actually recorded, the convergence detector determines whether data is being written to the first recording layer or second recording layer, and the laser is then driven at the peak power setting appropriate to the detected recording layer. The semiconductor laser can thus be driven at an output level strong enough to assure good signal quality.

The present invention thus provides an optical disc drive that can record and reproduce optical recording media having two recording layers so that labels can be easily printed on the recording media, the recording media can be automatically recorded and reproduced using a single optical head, and the recording media maintains good compatibility with optical recording media having only one recording layer.

It will be further noted that this optical disc drive and optical recording medium are designed so that the second recording layer is recorded and read through the first recording layer.

The amount of light reaching the second layer differs when the first layer is recorded (thus containing a combination of crystalline spaces and amorphous marks) and when the first layer is blank (only crystalline phase). If when recording the second layer, for example, the phase of the first layer directly below (that is, between the laser and second layer) where the second layer is recorded is blank (that is, only crystalline phase), the first layer transmittance is 50% as shown in FIG. 3. However, if the intervening first layer is partially or completely recorded, transmittance increases in accordance with the area of the recorded tracks in the first layer through which the light spot passes to reach the second layer.

Figure 30:
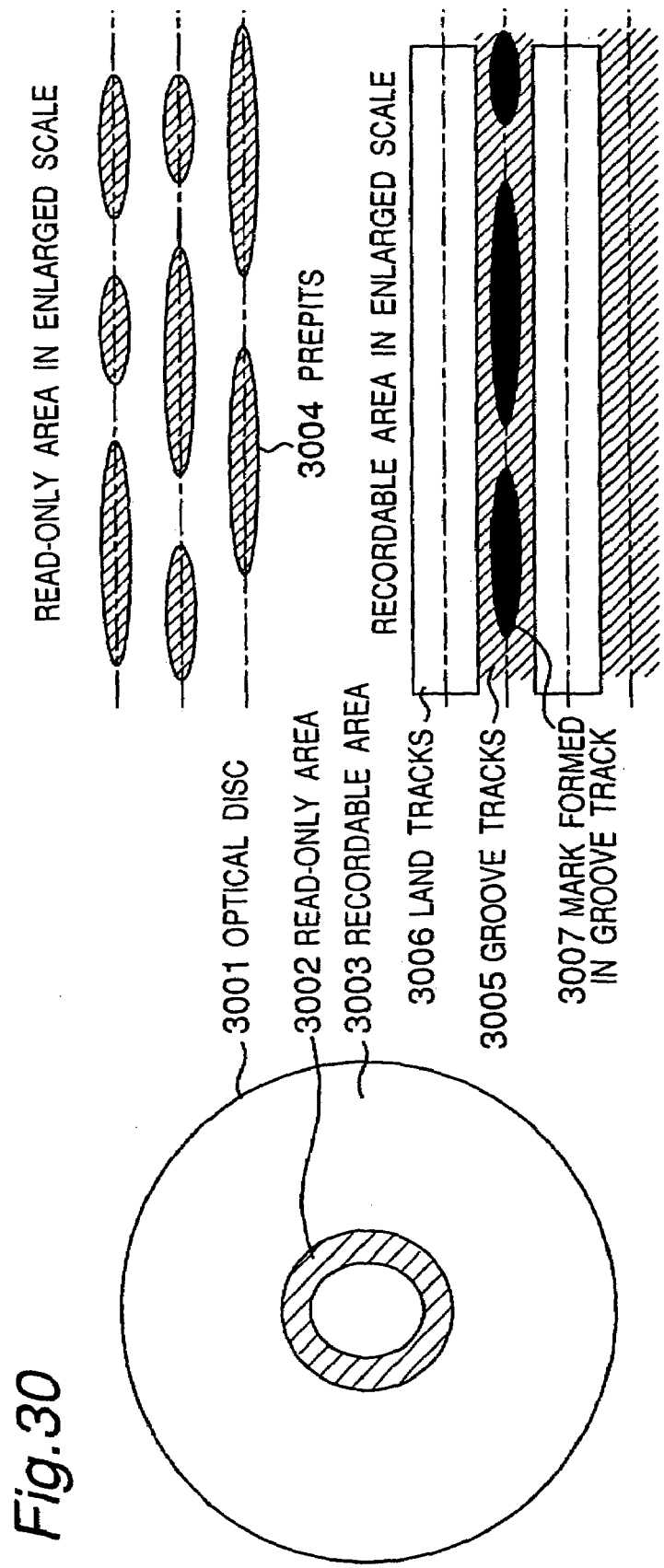
FIG. 30 shows the configuration of an optical disc according to an eleventh embodiment of the present invention.

This eleventh embodiment of the present invention is further described below with reference to FIG. 30. FIG. 30 shows the configuration of an optical disc 1701 according to the present embodiment.

Shown in FIG. 30 are the read-only area 3002 disposed to the inside circumference of the optical disc 3001, prepits 3004 preformed in the read-only area 3002, and the prepit track pitch 3005. The recordable area 3003 is provided on the outside circumference side of the read-only area 3002. Inside the recordable area 3003 are groove tracks 3005 and land tracks 3006, which are the tracks between the groove tracks. Reference numeral 3007 shows a mark formed in a groove track.

Information indicating which of the plural recording layers the light spot is focused on is modulated and recorded to the prepits in the read-only area 3002. Both the recordable area 3003 and read-only area 3002 are formed in each of the plural recording layers.

As a result, the convergence detector can identify which of the plural recording layers the light spot is focused on.

Embodiment 12

A twelfth embodiment of the present invention is described next below with reference to FIG. 27.

Figure 27:
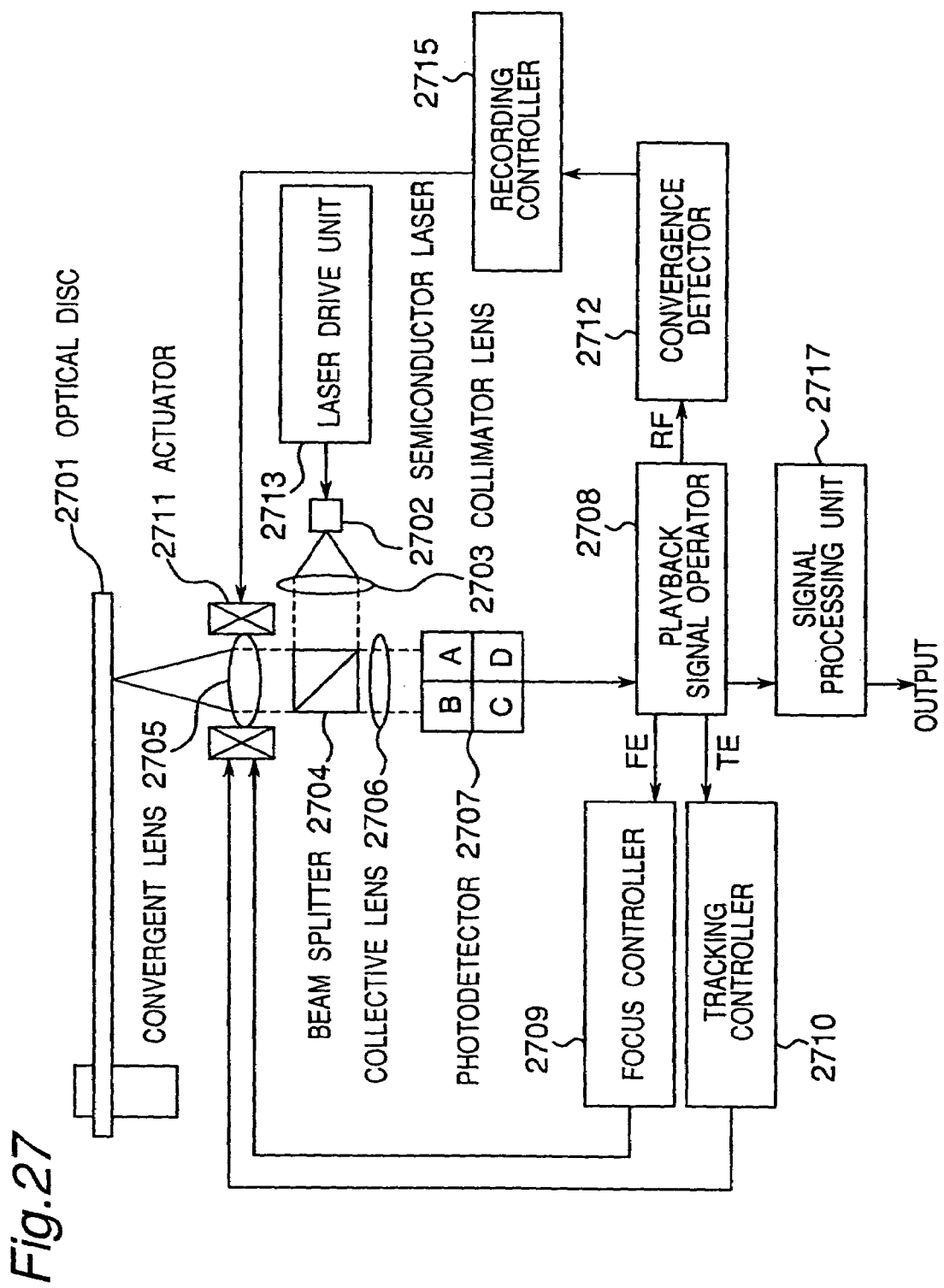
FIG. 27 is a block diagram of an optical disc drive according to a twelfth embodiment of the present invention.

Shown in FIG. 27 are optical disc 2701, semiconductor laser 2702, collimator lens 2703, beam splitter 2704, convergent lens 2705, collective lens 2706, photodetector 2707, playback signal operating means 2708, focus controller 2709, tracking controller 2710, actuator 2711, convergence detector 2712, laser drive unit 2713, recording controller 2715, and signal processing unit 2717.

The output of the convergence detector 2712 is obtained by a method used by the convergence detector in the second, third, or fourth embodiment.

When the light spot is focused on the first layer or the focal point is undetermined, the convergence detector 2712 controls the recording controller 2715 to set a recording compensation value optimized for the first layer.

When the light spot is focused on the second layer, the convergence detector 2712 controls the recording controller 2715 to set a recording compensation value optimized for the second layer.

Figure 29:
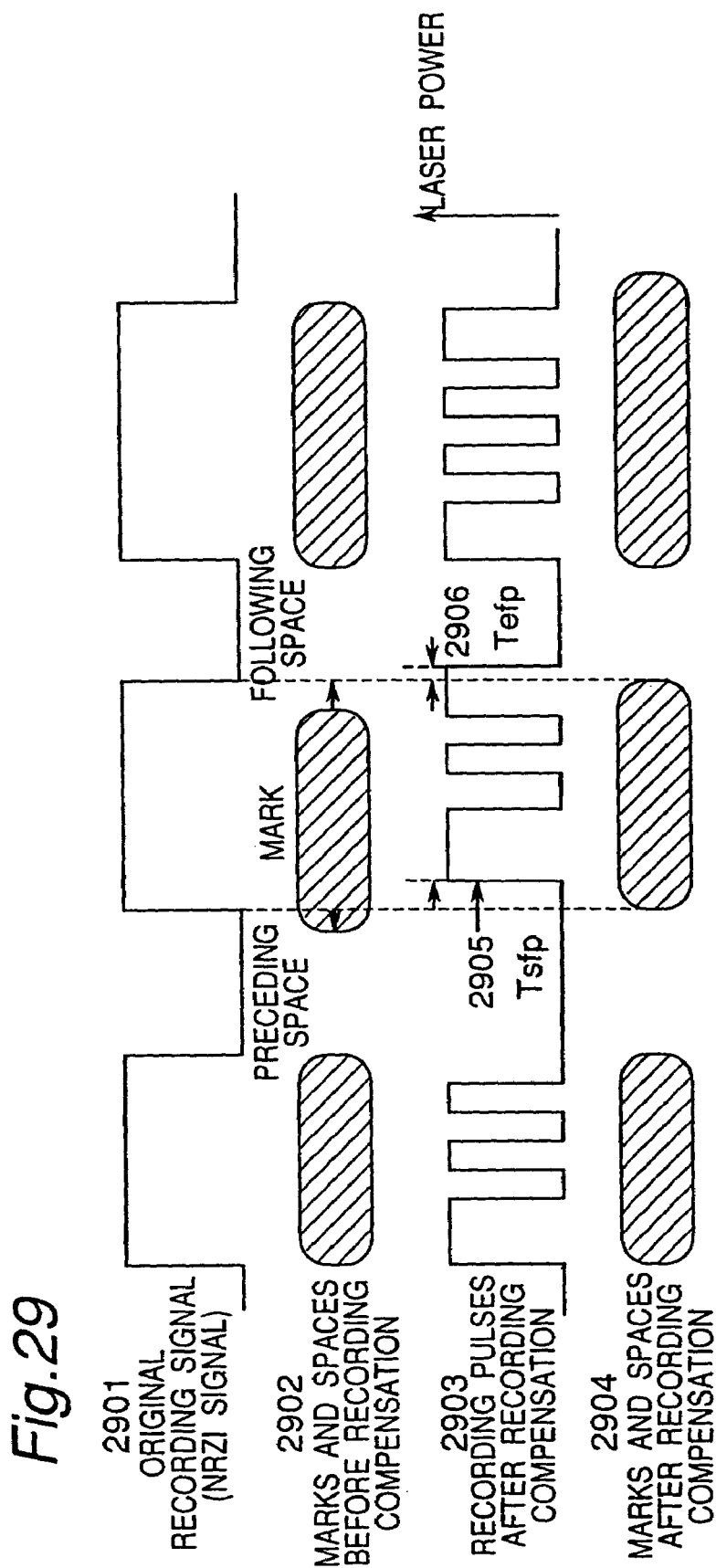
FIG. 29 is used to describe the recording compensation principle of a twelfth embodiment of the present invention.

A method for setting an optimized recording compensation value is described next with reference to FIG. 28 and FIG. 29. In FIG. 29 reference numeral 2901 shows a NRZI signal. Reference numeral 2902 shows the recording marks and spaces recorded for the NRZI signal 2901 before recording compensation. Note that the edges of the recording marks and spaces 2902 are offset from the reference edges of the NRZI signal due to the effects of heat interference. To eliminate this edge shifting, the positions of the first pulse and last pulse in the recording pulse train are adjusted according to the recording mark length, and the length of the spaces before and after the recording mark FIG. 28 shows examples of recording compensation tables. First pulse position Tsfp 2801 indicates the position of the first pulse and is determined by the recording mark length and length of the preceding space. For example, if the recording mark length is 3T and the length of the previous space is 3T, Tsfp is "a." End pulse position Telp 2802 indicates the position of the last pulse, and is determined by the recording mark length and the length of the following space. For example, if the mark length is 3T and the following space is 3T, Telp is "q."

The values a to af in these recording compensation tables are determined to achieve optimum recording signal quality in each layer.

The recording controller 2715 stores these recording compensation tables as lookup tables used to set the recording compensation value optimized for the recording layer identified by the convergence detector 2712.

By thus setting the recording power and recording compensation tables optimized for each recording layer, this embodiment of the invention improves recording and playback signal characteristics in the writable data area, and significantly improves the reliability of an optical disc with plural data recording layers.

This embodiment is further configured to read and write the second recording layer through the first recording layer. If when recording the second layer, for example, the phase of the first layer directly below (that is, between the laser and second layer) where the second layer is recorded is blank (that is, only crystalline phase), the first layer transmittance is 50% as shown in FIG. 3. However, if the intervening first layer is partially or completely recorded, transmittance increases in accordance with the area of the recorded tracks in the first layer through which the light spot passes to reach the second layer.

As described above, an optical disc drive according to the present invention can identify which of plural recording layers on the optical disc the light spot is focused on irrespective of whether the data area is recorded or blank. Both recording and playback signal quality can thus be improved in the data area of plural recording layers, and the reliability of an optical disc having plural recording layers can thus be significantly improved.

Embodiment 13

Figure 31:
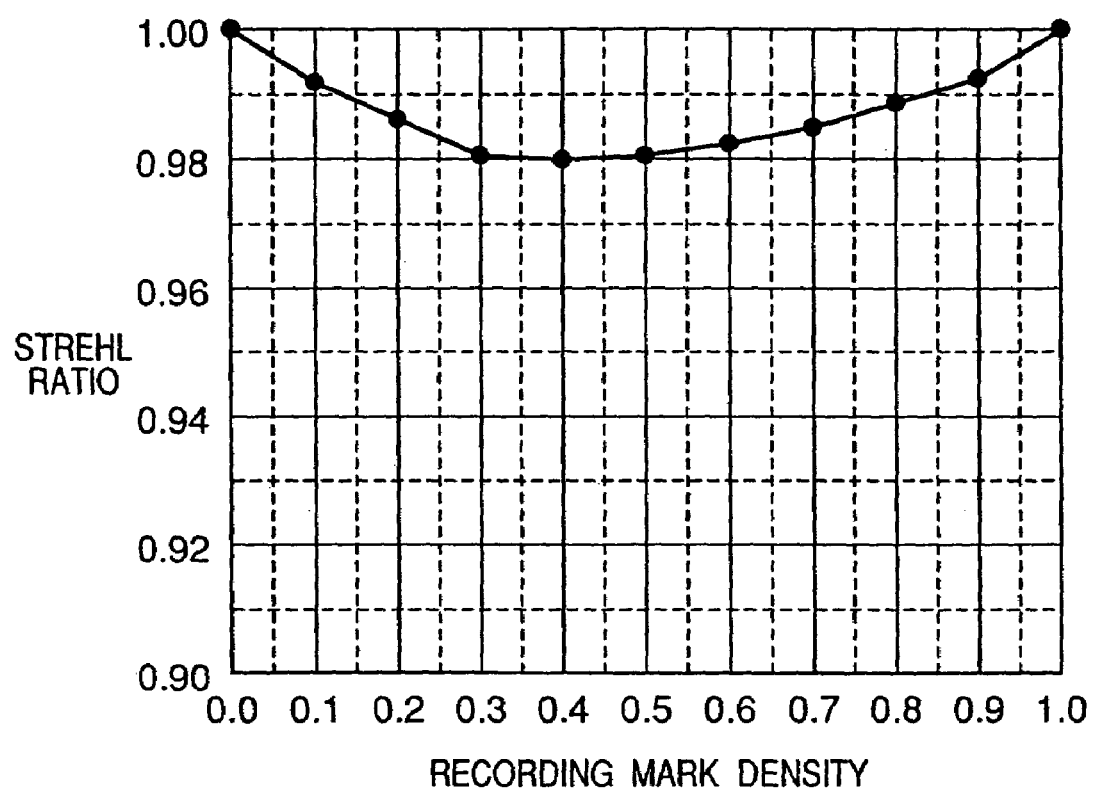
FIG. 31 describes a thirteenth embodiment of the present invention.

FIG. 31 is a graph showing the relationship between recording mark density in the first layer and Strehl ratio calculations in the second layer using a wavelength of 660 nm and 0.6 NA. The x-axis in FIG. 31 shows the recording mark density. A recording mark density of 0 indicates a blank (unrecorded) state. It will be known from FIG. 31 that as the recording density of the first layer increases, the Strehl number decreases. When the Strehl number decreases, beam strength at the second layer drops proportionately to the Strehl ratio if the semiconductor laser emission power is the same, and it is therefore necessary to increase semiconductor laser emission power.

It is therefore possible to improve playback signal quality from the optical disc by setting the peak power and bias power levels used to record to the second layer of the optical disc according to the mark density of the first layer.

Figure 34:
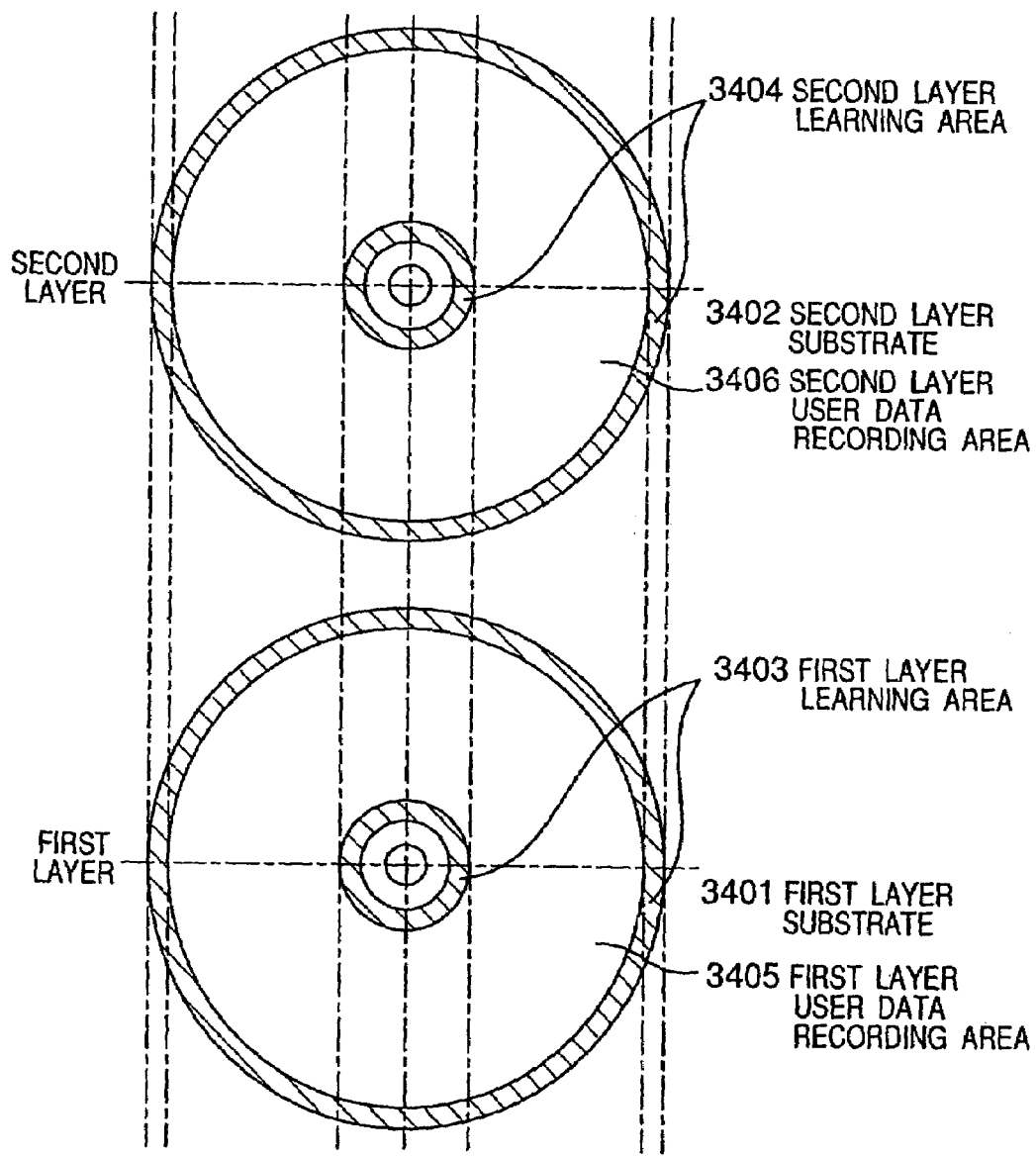
FIG. 34 shows an optical disc recorded and reproduced by an optical disc drive according to a first embodiment of the present invention.

The configuration of a recording power learning area is described next with reference to FIG. 34. FIG. 34 shows the configuration of an optical disc with a first layer 3401 on the side to which the light spot is incident, and a second layer 3402 on which the light spot is focused after passing through the first layer. The first layer 3401 and second layer 3402 are concentrically bonded parallel to each other.

Learning areas 3403 are disposed at both the inside and outside circumference parts of the first layer 3401, and learning areas 3404 are likewise disposed at the inside and outside circumference parts of the second layer 3402.

User data recording areas 3405 and 3406 for writing user data are disposed to the first layer and second layer, respectively, between the inside and outside circumference areas.

The learning areas of the first and second layers are located at substantially the same positions from the disc center. Methods for determining the second layer recording power for each of the following three first layer states are described next below.

(1) first layer learning area has a blank area
(2) first layer learning area is partially recorded
(3) first layer learning area is completely recorded A method for determining the second layer recording power settings when (1) the entire learning area of the first layer is blank is described first below with reference to the flow chart in FIG. 32.

If the first layer learning area is blank or it is known that there is a blank area in the fast layer learning area, the optical head seeks the blank learning area.

The light spot is then focused and tracked on the second layer through the blank learning area of the first layer. The second layer recording power levels are thus earned after first confirming that the first layer is blank. There are various ways of determining the recording power, one of which is the 3T mark and space method described above in the twelfth embodiment.

The recording power levels learned for recording to the second layer when the first layer is blank are then stored in memory where the peak power in a land track is Ppl0, bias power in a land track is Pbl0, peak power in a groove track is Ppg0, and bias power in a groove track is Pbg0,. It should be noted that while the recording power is learned and stored for the peak power and bias power in this example, other power levels can obviously be learned and stored.

Next, the light spot is focused and tracked to the learning area of the first layer. Dummy data is recorded to a specific part of the first layer learning area in order to convert it from a blank to a recorded state. Next, the light spot is focused and tracked to the second layer in the area where this dummy data was recorded. The recording power levels for the second layer are thus learned after confirming that the first layer has been recorded.

The recording power levels learned for recording to the second layer when the first layer is not blank are then stored in memory where the peak power in a land track is Ppl1, bias power in a land track is Pbl1, peak power in a groove track is Ppg1, and bias power in a groove track is Pbg1. It should be noted that while the recording power is learned and stored for the peak power and bias power in this example, other power levels can obviously be learned and stored A method for determining the second layer recording power settings when (2) the first layer learning area is partially recorded is described next below with reference to the flow chart in FIG. 32.

If part of the first layer leaning area is already recorded, the optical head seeks the first layer learning area and the light spot is then focused and tracked on the first layer.

After confirming that the light spot is focused on the learning area in the first layer, data in a specific part of the first layer learning area is erased so that it is again blank (has no data recorded thereto). The light spot is then focused and tracked on the second layer through this blank learning area of the first layer. The second layer recording power levels are thus learned after first confirming that the first layer is blank. There are various ways of determining the recording power, one of which is the 3T mark and space method described above.

The recording power levels learned for recording to the second layer when the first layer is blank are then stored in memory where the peak power in a land track is Ppl0, bias power in a land track is Pbl0, peak power in a groove track is Ppg0, and bias power in a groove track is Pbg0. It should be noted that while the recording power is learned and stored for the peak power and bias power in this example, other power levels can obviously also be learned and stored.

Next, the light spot is focused and tracked to the learning area of the first layer. Dummy data is recorded to a specific part of the first layer learning area in older to convert it from a blank to a recorded state. Next, the light spot is focused and tracked to the second layer in the area where this dummy data was recorded.

The recording power levels for the second layer are thus learned after confirming that the first layer has been recorded.

The recording power levels learned for recording to the second layer when the fist layer is not blank are then stored in memory where the peak power in a land track is Ppl1, bias power in a land track is Pbl1, peak power in a groove track is Ppg1, and bias power in a groove track is Pbg1. It should be noted that while the recording power is learned and stored for the peak power and bias power in this example, other power levels can obviously be learned and stored.

A method for determining the second layer recording power settings when (3) all of the first layer learning area has been recorded is described next below with reference to the flow chart in FIG. 32.

If all of the first layer learning area is already recorded, the optical head seeks the first layer learning area and the light spot is then focused and tracked on the first layer.

After confirming that the light spot is focused on the learning area in the first layer, data in a specific part of the first layer learning area is erased so that it is again blank (has no data recorded thereto). The light spot is then focused and tracked on the second layer through this blank learning area of the first layer. The second layer recording power levels are thus learned after first confirming that the first layer is blank. There are various ways of determining the recording power, one of which is the 3T mark and space method described above.

The recording power levels learned for recording to the second layer when the first layer is blank are then stored in memory where the peak power in a land track is Ppl0, bias power in a land track is Pbl0, peak power in a groove track is Ppg0, and bias power in a groove track is Pbg0. It should be noted that while the recording power is learned and stored for the peak power and bias power in this example, other power levels can obviously also be learned and stored.

Next, the light spot is focused and tracked to the learning area of the first layer. When it is known that a particular part of the first layer learning area is not blank, the optical head directly seeks that recorded area. Next, the light spot is focused and tracked to the second layer through the recorded part of the first layer learning area The recording power levels for the second layer are thus learned after confirming that the first layer has already been recorded.

The recording power levels learned for recording to the second layer when the first layer is not blank are then stored in memory where the peak power in a land track is Ppl1, bias power in a land track is Pbl1, peak power in a groove track is Ppg1, and bias power in a groove track is Pbg1. It should be noted that while the recording power is learned and stored for the peak power and bias power in this example, other power levels can obviously be learned and stored.

Methods (1), (2) and (3) above detect the initial state of the first layer learning area, but this initial state detection step can be eliminated to simplify the system. In this case the recording power levels for the second layer are determined using the above method (2) based on the assumption that part of the first layer learning area is not blank.

Recording to the user data area in the second layer is described next. If the part of the fast layer the light spot passes through in order to record to the user data area of the second layer is largely blank, the recording power can be set to peak power Ppl0 and bias power Pbl0 in the land tracks, and to peak power Ppg0 and bias power Pbg0 in the groove tracks.

If the part of the first layer the light spot passes through in order to record to the user data area of the second layer is largely recorded, the recording power can be set to peak power Ppl1 and bias power Pbl1 in the land tracks, and to peak power Ppg1 and bias power Pbg1 in the groove tracks.

If the part of the first layer the light spot passes through in order to record to the user data area of the second layer contains a mixture of recorded and blank areas, or if the recording mark density is between blank and recorded states, the recording power can be set to peak power Ppl0 or Ppl1 and bias power Pbl0 or Pbl1 in the land tracks, and to peak power Ppg0 or Ppg1 and bias power Pbg0 or Pbg1 in the groove tracks.

Alternatively, if the part of the first layer the light spot passes through in order to record to the user data area of the second layer contains a mixture of recorded and blank areas, or if the recording mark density is between blank and recorded states, the recording power can be set to an extrapolated peak power Ppl2 between Ppl0 and Ppl1 and extrapolated bias power Pbl2 between Pbl0 and Pbl1 in the land tracks, and to extrapolated peak power Ppg2 between Ppg0 and Ppg1 and extrapolated bias power Pbg2 between Pbg0 and Pbg1 in the groove tracks.

These power levels can be extrapolated by simply obtaining the averages as shown below.

$(Ppl0+Ppl1)/2$ $(Pbl0+Pbl1)/2$ $(Ppg0+Ppg1)/2$ $(Pbg0+Pbg1)/2$

Alternatively, the learned power levels can be weighted and then added to obtain the extrapolated levels as shown below.

$Ppl0*y1+Ppl1*y2$ where y1 and y2 are real numbers such that y1+y2=1, and are determined according to the recording mark density of the first layer through which the light spot passes.

It should be noted that while the land track peak power is considered here, the same operation can be applied to the land track bias power and the groove track peak power and bias power levels.

By setting the recording power levels for the second layer according to the recording mark density in the first layer through which the light spot passes when recording to the second layer, recording and playback signal quality can be improved in the data areas of plural data recording layers, and the reliability of an optical disc having plural data recording layers can be significantly improved.

FIG. 31 is a graph showing the relationship between recording mark density in the first layer and Strehl ratio calculations in the second layer using a wavelength of 660 nm and 0.6 NA. The x-axis in FIG. 31 shows the recording mark density. A recording mark density of 0 indicates a blank (unrecorded) state. It will be known from FIG. 31 that as the recording density of the first layer increases, the Strehl number decreases. When the Strehl number decreases, beam strength at the second layer drops proportionately to the Strehl ratio if the semiconductor laser emission power is the same, and it is therefore necessary to increase semiconductor laser emission power. Because semiconductor laser emission power differs, playback signal quality from the optical disc can be improved by determining the recording compensation tables for recording to the second layer of the disc according to the mark density of the first layer.

Methods for determining the second layer recording power for each of the following three first layer states are described next below.

Figure 33:
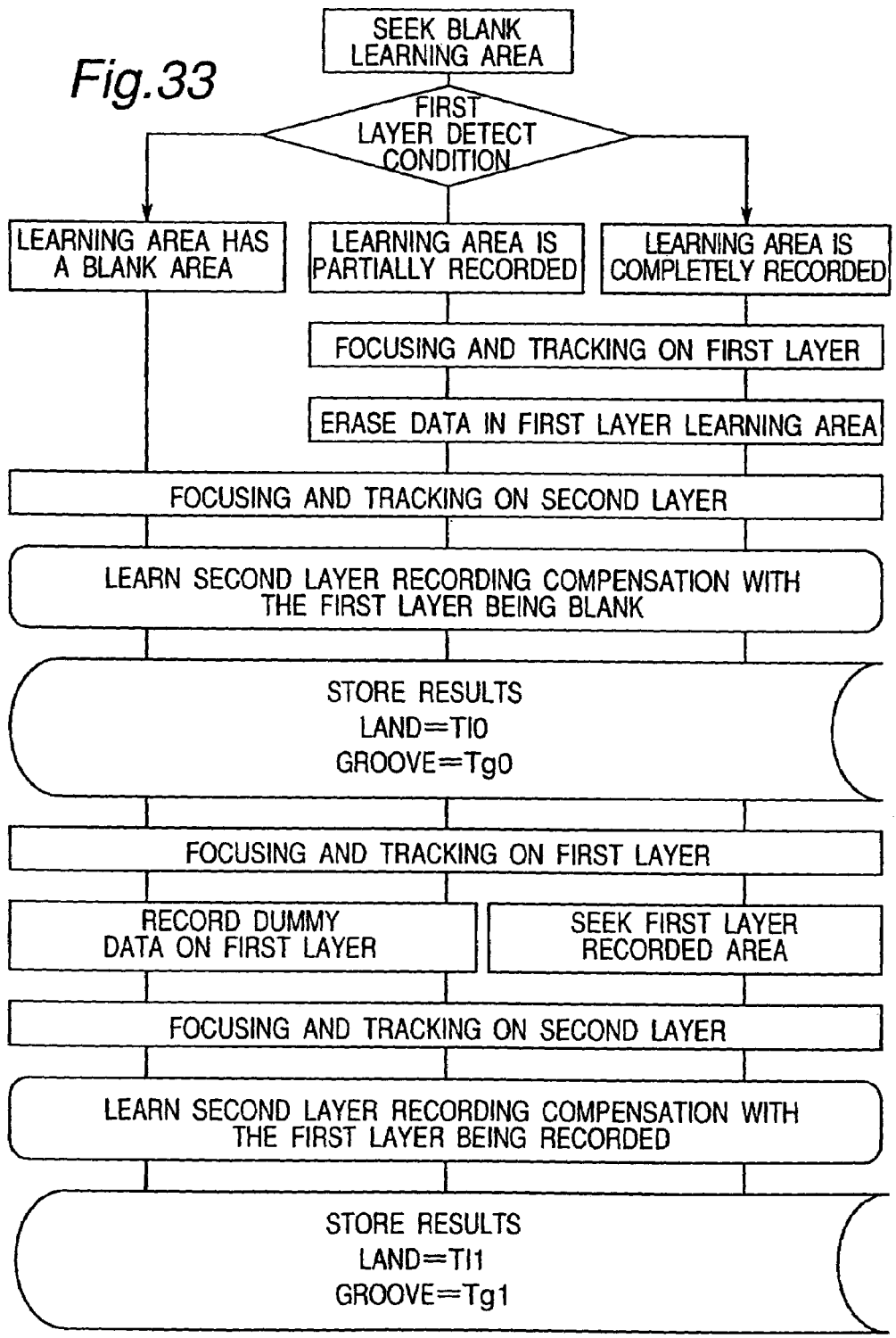
FIG. 33 is a flow chart of the recording and playback process in a fourteenth embodiment of the present invention.

(1) first layer learning area has a blank area
(2) first layer learning area is partially recorded
(3) first layer learning area is completely recorded A method for determining the second layer recording compensation tables when (1) the entire learning area of the fist layer is blank is described first below with reference to the flow chart in FIG. 33.

If the first layer learning area is blank or it is known that there is a blank area in the first layer learning area, the optical head seeks the blank learning area.

The light spot is then focused and tracked on the second layer through the blank learning area of the first layer. The second layer recording compensation table is thus learned after first confirming that the first layer is blank There are various ways of determining the recording compensation table, one of which is the minimum jitter method.

The recording compensation tables learned for recording to the second layer when the first layer is blank are then stored in memory as land track recording compensation table Tl0 and groove track recording compensation table Tg0. The recording compensation tables referred to here and below are the values a to af in the recording compensation tables described above, and tables Tl0 and Tg0 are the respective collections of the values a to af.

While the recording compensation tables define four recording compensation levels, the invention shall not be so limited and a different number of compensation levels can be used.

Next, the light spot is focused and tracked to the learning area of the first layer. Dummy data is recorded to a specific part of the first layer learning area in order to convert it from a blank to a recorded state. Next, the light spot is focused and tracked to the second layer in the area where this dummy data was recorded.

After thus confirming that the first layer has been recorded, the recording compensation tables for the second layer are learned. The results are then stored in memory as land track recording compensation table Tl1 and groove track recording compensation table Tg1.

A method for determining the second layer recording compensation tables when (2) the first layer learning area is partially recorded is described next below with reference to the flow chart in FIG. 33.

If part of the first layer learning area is already recorded, the optical head seeks the first layer learning area and the light spot is then focused and tracked on the first layer.

After confirming that the light spot is focused on the learning area in the first layer, data in a specific part of the first layer learning area is erased so that it is again blank (has no data recorded thereto). The light spot is then focused and tracked on the second layer through this blank learning area of the first layer. The second layer recording compensation table is thus learned after first confirming that the first layer is blank. There are various ways of determining the recording compensation tables, one of which is the minimum jitter method.

The recording compensation tables learned for recording to the second layer when the first layer is blank are then stored in memory as land track recording compensation table T10 and groove track recording compensation table Tg0.

Next, the light spot is focused and tracked to the learning area of the first layer. Dummy data is recorded to a specific part of the first layer learning area in order to convert it from a blank to a recorded state. Next, the light spot is focused and tracked to the second layer in the area where this dummy data was recorded. After thus confirming that the first layer has been recorded, the recording compensation tables for the second layer are learned. The results are then stored in memory as land track recording compensation table Ill and groove track recording compensation table Tg1.

A method for determining the second layer recording compensation tables when (3) the first layer learning area is completely recorded is described next below with reference to the flow chart in FIG. 33.

If all of the first layer learning area is already recorded, the optical head seeks the first layer learning area and the light spot is then focused and tracked on the first layer.

After confirming that the light spot is focused on the learning area in the first layer, data in a specific part of the first layer learning area is erased so that it is again blank (has no data recorded thereto). The light spot is then focused and tracked on the second layer through this blank learning area of the first layer. The second layer recording compensation tables are then learned after first confirming that the first layer is blank. There are various ways of determining the recording compensation tables, one of which is the minimum jitter method.

The recording compensation tables learned for recording to the second layer when the first layer is blank are then stored in memory as land track recording compensation table 10 and groove track recording compensation table Tg0.

Next, the light spot is focused and tracked to the learning area of the first layer. When it is known that a particular part of the first layer learning area is not blank, the optical head directly seeks that recorded area. Next, the light spot is focused and tracked to the second layer through the recorded part of the first layer learning area. After thus confirming that the first layer is not blank, the second layer recording compensation tables are learned. The results are then stored in memory as land track recording compensation table Tl1 and groove track recording compensation table Tg1.

Methods (1), (2) and (3) above detect the initial state of the first layer learning area, but this initial state detection step can be eliminated to simplify the system. In this case the recording compensation tables for the second layer are determined using the above method (2) based on the assumption that part of the first layer learning area is not blank.

Recording to the user data area in the second layer is described next. If the part of the first layer the light spot passes through in order to record to the user data area of the second layer is largely blank, land track recording compensation table Tl0 and groove track recording compensation table Tg0 are used.

If the part of the first layer the light spot passes through in order to record to the user data area of the second layer is largely recorded, land track recording compensation table Tl1 and groove track recording compensation table Tg1 are used.

If the part of the first layer the light spot passes through in order to record to the user data area of the second layer contains a mixture of recorded and blank areas, or if the recording mark density is between blank and recorded states, either land track recording compensation table Tl0 or Tl1, and either groove track recording compensation table Tg0 or Tg1, are used.

Alternatively, if the part of the first layer the light spot passes through in order to record to the user data area of the second layer contains a mixture of recorded and blank areas, or if the recording mark density is between blank and recorded states, an extrapolated table Tl2 between land track recording compensation table Tl0 and Tl1, and an extrapolated table Tg2 between groove track recording compensation table Tg0 and Tg1, can be used.

Table extrapolation is described next with reference to FIG. 36. In FIG. 36 reference numeral 3605 shows exemplary land track recording compensation tables Tl0 learned when the first layer is blank, and reference numeral 3606 shows exemplary land track recording compensation tables Tl1 learned when the first layer is recorded (not blank).

The tables shown in block 3605 in FIG. 36 define the 36 values from A1 to Af1 corresponding to various mark and space combinations at the first pulse in the pulse train. The tables shown in block 3606 define the 36 values from A2 to Af2 corresponding to various mark and space combinations at the last pulse in the pulse train.

The tables define compensation values for same mark and space combinations. For example, A1 and A2 define compensation values for a 3T space and 3T mark combination but for different first layer conditions.

Extrapolated tables can be calculated by obtaining the average of the values at the same mark and space combination positions in the tables as shown below.

$(A1 + A2)/2$ $(B1 + B2)/2$

...

$(Af1 + Af2)/2$

Alternatively, the tables can be extrapolated by weighting and then adding the values as shown below.

$A1^*z1 + A2^*z2$ $B1^*z1 + B2^*z2$

...

$Af1^*z1 + Af2^*z2$ where $z1$ and $z2$ are real numbers such that $z1+z2=1$, and are determined according to the recording mark density of the first layer through which the light spot passes.

It should be noted that while the land track compensation tables Tl0 and Tl1 are considered here, the same operation can be applied to the groove track tables.

By setting recording compensation tables for the second layer according to the recording mark density in the first layer through which the light spot passes when recording to the second layer, recording and playback signal quality can be improved in the data areas of plural data recording layers, and the reliability of an optical disc having plural data recording layers can be significantly improved.

Embodiment 14

A fourteenth embodiment of the present invention is described next with reference to FIG. 35, which shows the configuration of an optical disc in the present embodiment.

Figure 35:
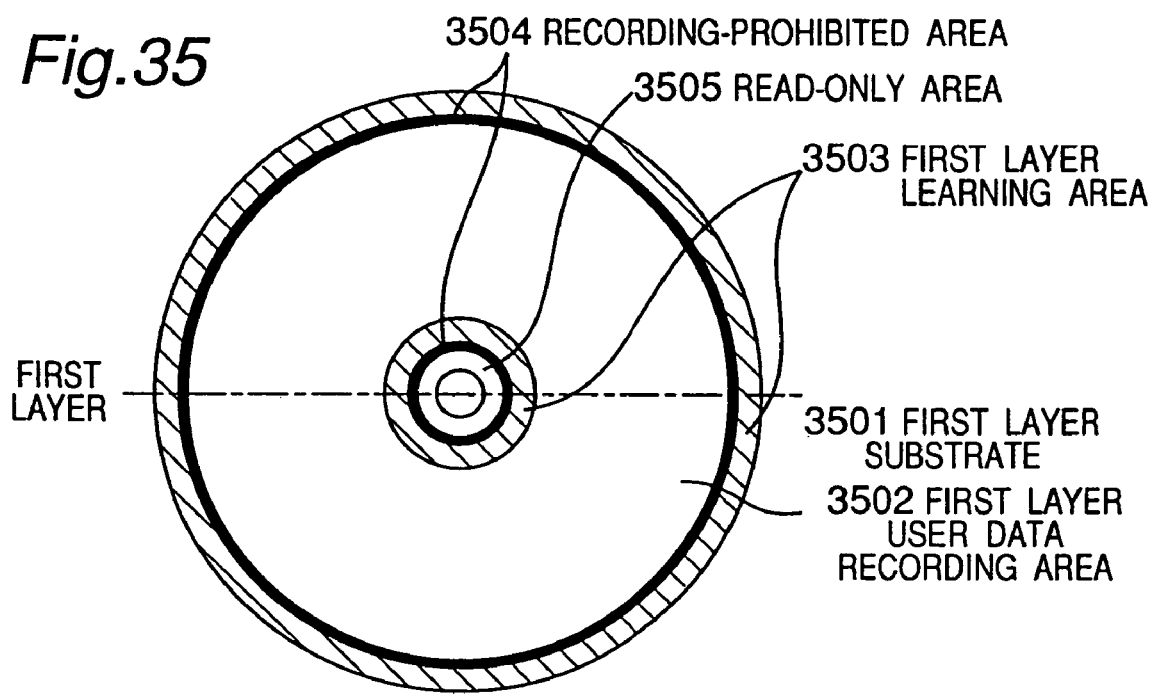
FIG. 35 shows the configuration of an optical disc according to the fifteenth and sixteenth embodiments of the present invention.

The optical disc shown in FIG. 35 has a first layer substrate 3501, first layer user data recording area 3502, first layer learning areas 3503, recording-prohibited areas 3504 disposed in the first layer learning area 3503, and read-only area 3505 provided on the inside circumference side of the first layer learning area at the inside circumference of the disc.

The recording-prohibited areas 3504 are described next. When recording to the second layer, the recording power or recording compensation table optimized for the second layer differs according to the recording mark density in the first layer through which the light spot passes in order to record to the second layer. It is therefore necessary to learn the recording power levels or recording compensation tables that are best for a particular recording mark density.

Providing recording-prohibited areas 3504 as shown in FIG. 35 enables the optimum settings for a blank first layer to be learned more quickly when recording the second layer. If a recording-prohibited area 3504 is not provided, it is necessary as described above to determine whether (1) the first layer learning area has a blank area, (2) the first layer learning area is partially recorded, or (3) the first layer learning area is completely recorded.

Figure 32:
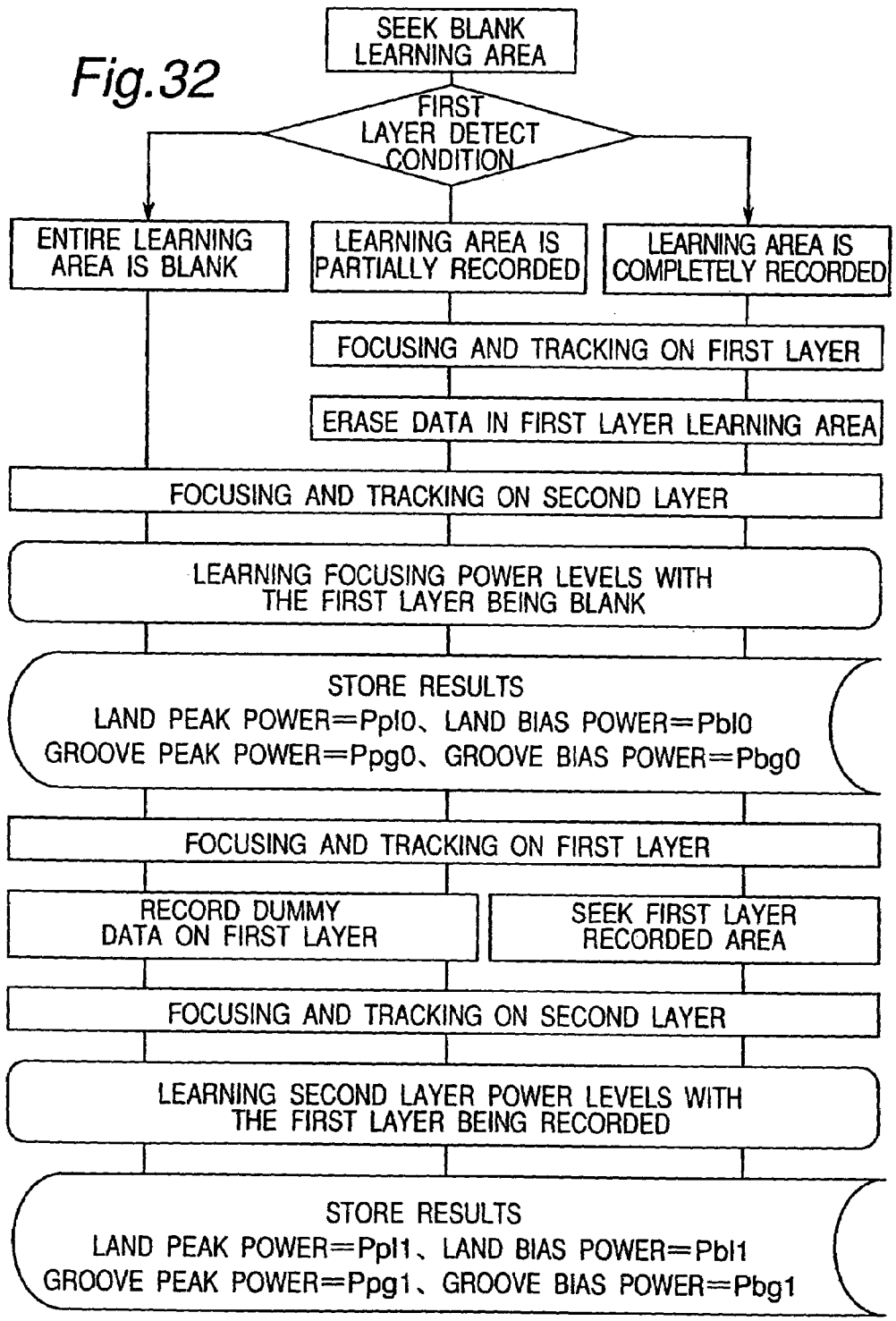
FIG. 32 is a flow chart of the recording and playback process in a thirteenth embodiment of the present invention.

If, however, it is known that there is a blank area in the first layer, learning can follow the blank area conditions in the flow chart shown in FIG. 32. It is therefore not necessary to erase an area in the first layer in order to create a blank area, and the learning time is shortened accordingly.

Embodiment 15

A fifteenth embodiment of the present invention is described next with reference to FIG. 35, which shows the configuration of an optical disc in the present embodiment.

Information identifying the type of optical disc is preprinted in the read-only area 3505 in the formed of modulated prepits. The locations of the first and last radial positions of the recording-prohibited areas 3504 are also recorded in the read-only area 3505. Alternatively, the start and end addresses of the recording-prohibited areas 3504 are recorded The disc drive can therefore know by reading the read-only area 3505 that there is an area on the disc that cannot be recorded to, and can know that the first layer is blank when the light spot passes through the recording-prohibited area 3504 of the first layer when learning the recording power or recording compensation tables in the learning area of the second layer.

It is therefore possible to omit the steps for erasing data in the first layer in order to confirm a blank area in the first layer when learning the recording power or recording compensation tables for the second layer, and the learning time can be shortened accordingly.

By thus setting recording power levels or recording compensation tables optimized for each recording layer, recording and playback signal characteristics can be improved in the data areas of plural data recording layers, and the reliability of an optical disc having plural data recording layers can be significantly improved.

An optical disc, optical disc drive, and optical disc playback method according to the present invention can thus identify which of plural data recording layers the light spot is focused on whether or not data is recorded to a data area of an optical disc having plural data recording layers. The reliability of an optical disc having plural data recording layers can therefore be significantly improved Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. An optical disc comprising:
   a first substrate having a first data layer;
   a transparent reflection layer formed on the first data layer of the first substrate;
   a second substrate having a second data layer to which is disposed a recordable film for recording and reproducing information; and
   an adhesive layer for bonding the first substrate and the second substrate with the first data layer and the second data layer facing each other, wherein
   said optical disc is configured so that information recorded to the first data layer and the second data layer is read through the first substrate,
   the first data layer and the second data layer each have a separate user data area for recording and reading information, a learning area for test recording, and a read-only area for reading information, and
   the learning area of the first data layer has a specific part that is provided with a recording-prohibited area where writing data is prohibited.

2. An optical disc as described in claim 1, wherein a location of the recording-prohibited area is recorded with modulated prepits prerecorded to the read-only area.

* * * * *